(12) United States Patent
Ilic et al.

(10) Patent No.: US 10,554,164 B2
(45) Date of Patent: Feb. 4, 2020

(54) MODULAR EXTRA LOW VOLTAGE ELECTRIC VEHICLE POWER SYSTEM

(71) Applicant: Empower Micro Systems Inc, Santa Clara, CA (US)

(72) Inventors: Milan Ilic, San Jose, CA (US); Dragan Maksimovic, Boulder, CO (US); Mika Nuotio, San Jose, CA (US)

(73) Assignee: SUNGROW POWER SUPPLY CO., LTD. (CN)

( * ) Notice: Subject to any disclaimer, the term of this patent is extended or adjusted under 35 U.S.C. 154(b) by 0 days.

(21) Appl. No.: 15/340,824

(22) Filed: Nov. 1, 2016

(65) Prior Publication Data

US 2018/0123496 A1    May 3, 2018

(51) Int. Cl.
*G05B 5/00* (2006.01)
*H02P 27/08* (2006.01)
*B60L 15/00* (2006.01)
*H02J 7/00* (2006.01)

(52) U.S. Cl.
CPC ............ *H02P 27/08* (2013.01); *B60L 15/007* (2013.01); *B60L 2210/10* (2013.01); *B60L 2210/30* (2013.01); *B60L 2240/526* (2013.01); *B60L 2250/26* (2013.01); *H02J 7/0021* (2013.01)

(58) Field of Classification Search
CPC ........................... H02M 2001/007; H02J 7/34
See application file for complete search history.

(56) References Cited

U.S. PATENT DOCUMENTS

| 2006/0125448 A1* | 6/2006 | Okui | H02J 9/062 |
| | | | 320/138 |
| 2015/0076916 A1* | 3/2015 | Cheng | H02J 7/007 |
| | | | 307/66 |
| 2016/0376005 A1* | 12/2016 | Phan | B64D 27/02 |
| | | | 244/2 |

* cited by examiner

*Primary Examiner* — Karen Masih
(74) *Attorney, Agent, or Firm* — Tran & Associates

(57) ABSTRACT

In some aspects, an electric vehicle power system may comprise two or more electrically connected power modules connected to a system communication bus. Each power module may comprise a rechargeable battery electrically connected to a DC bus, an inverter circuit electrically connected to the DC bus, and at least one of a single-phase rectifier circuit electrically connected to the DC bus or a multi-phase rectifier circuit electrically connected to the DC bus. A local controller configured to send control signals may be connected to the rechargeable battery, the inverter circuit, and the at least one of the single-phase rectifier circuit or the multi-phase rectifier circuit. The single-phase rectifier circuit may be configured to convert a single-phase AC power signal into the DC voltage of the DC bus. The multi-phase rectifier circuit may be configured to convert a multi-phase AC power signal into the DC voltage of the DC bus.

20 Claims, 16 Drawing Sheets

MODULAR EXTRA LOW VOLTAGE ELECTRIC VEHICLE POWER SYSTEM

BACKGROUND

Electric and hybrid vehicles have become a promising alternative to vehicles that use internal combustion engines. These vehicles typically utilize an electric motor driven by rechargeable batteries, either alone or in conjunction with a gasoline-powered internal combustion engine. Conventional electric vehicle systems utilize numerous re-chargeable batteries connected in series to achieve a high output operating voltage, usually in excess of 400 V. High operating voltages are used to improve operating efficiency and the charging time of electric vehicles, but require costly specialized power systems, such as high-voltage power electronics components, cables, and wires, in order to maintain proper safety precautions. In addition, such monolithic battery systems may be relatively difficult and expensive to maintain or replace. The series configuration of the batteries introduces potential limitations to the life of the battery stack, and if one of the batteries in the series configuration fails, the other batteries in the series configuration will suffer and degrade as well.

A low voltage electric vehicle power system would mitigate the costs associated with cables and wires and would allow for a modular design. Such a design would allow for the entire system to continue functioning at a lower power output if one of the modules failed. Additionally, a modular approach would allow for increased customizability as the electric vehicles range can be increased with the addition of individual modules to upgrade the power system.

SUMMARY

Disclosed herein are systems, devices, and methods for an electric vehicle power system, and in particular, a modular, low-voltage electric vehicle power system. In some aspects, an electric vehicle power system may comprise two or more electrically connected power modules connected to a system communication bus. Each power module may comprise one or more rechargeable batteries electrically connected to a DC bus, an inverter circuit electrically connected to the DC bus, and at least one of a single-phase rectifier circuit electrically connected to the DC bus or a multi-phase rectifier circuit electrically connected to the DC bus. A local controller configured to send control signals may be connected to one or more of the rechargeable battery, the inverter circuit, and the at least one of the single-phase rectifier circuit or the multi-phase rectifier circuit. The local controller may also send and receive status and sensor input/output signals, such as voltage and current sensor readings from the rechargeable battery, inverter circuit, or rectifier circuit(s). The inverter circuit may be any suitable DC-to-AC converter circuit configured to convert a DC voltage of the DC bus into an AC power signal. In some embodiments, the inverter AC circuit output may be single-phase or multi-phase and may operate at any suitable voltage level, such as 30 V or 40 V rms. The inverter circuit may be configured to be connected to an electric motor and to power the electric motor. The electric motor may be single-phase or may have multiple windings and may be at least part of an electric vehicle powertrain designed to power the electric vehicle. For example, the electric motor may be connected to a suitable transmission and power one or more wheels of the electric vehicle. The single-phase rectifier circuit may be any suitable AC-to-DC single-phase power converter, such as a half-wave rectifier, a full-wave center-tapped rectifier, or a full-wave bridge rectifier, configured to convert a single-phase AC power signal into the DC voltage of the DC bus. As an illustrative example, the single-phase rectifier circuits from a plurality of power modules may be connected in series to a typical AC wall outlet for charging. The multi-phase rectifier circuit may be any suitable AC-to-DC multi-phase power converter, including, but not limited to, a three-phase half-wave rectifier, a three-phase full-wave center-tapped rectifier, a three-phase full-wave bridge rectifier, or a twelve-pulse bridge rectifier, configured to convert a multi-phase AC power signal into the DC voltage of the DC bus. The local controller may be configured to generate one or more control signals, such as pulse-width modulation signals of various duty cycles. The power modules are connected in parallel to at least one electric motor.

In some embodiments, each power module may comprise a DC-to-DC converter circuit electrically connected to the DC bus and to an auxiliary power bus. The auxiliary power bus may provide power to some or all of the electronic systems in the vehicle that do not include the power train. For example, the auxiliary power bus may provide electric power to a radio/entertainment system, USB charger, or other accessory in the vehicle. The DC-to-DC converter may be any suitable DC-to-DC converter, such as a buck converter, a buck-boost converter, a boost-buck converter, a push-pull converter, or a full bridge converter, configured to convert a DC power signal from one voltage level to another voltage level.

In some embodiments, the local controller in each power module may be configured to detect the current or voltage of the inputs or outputs of each component of the power module, such as the DC voltage of the DC bus or an input voltage, input current, or output current of the single-phase rectifier circuit or the multi-phase rectifier circuit. In some embodiments, the local controller in each power module may be configured to detect an input current or input voltage of the inverter circuit or an output current or voltage of the inverter circuit. In some embodiments, the local controller may be configured to detect one or more of the voltage, current, temperature, and fault signals of the power module batteries.

In some embodiments, the local controller in each power module may be configured to transmit a control signal to the inverter circuit in order to control a power output of the inverter circuit. In some embodiments, the control signal transmitted to the inverter circuit by the local controller in each power module may be a pulse-width modulation signal with an adjustable duty cycle. In some embodiments, the power output may be single-phase or multi-phase operating at 30 V or 40 V. In some embodiments, the control signal may be a DC voltage signal between a minimum voltage and maximum voltage. For example, the control signal may vary between 0V and 5V to indicate various control commands or states.

In some embodiments, the local controller in each power module may be configured to transmit a control signal to the single-phase rectifier circuit or the multi-phase rectifier circuit to control an output power of the single-phase rectifier circuit or the multi-phase rectifier circuit, respectively. The control signal transmitted to the single-phase rectifier circuit or the multi-phase rectifier circuit by the local controller in each power module may be a pulse-width modulation signal with a variable duty cycle. The input power of the single-phase rectifier circuit or the multi-phase rectifier circuit may be single-phase or multi-phase operating at a suitable voltage level. In some embodiments, the operating voltage level of the single-phase rectifier circuit or the multi-phase rectifier circuit may be 30 V or 40 V rms.

In some embodiments, the DC bus voltage of each power module may be below 50 volts. An operating voltage below 50 volts is defined as extra-low voltage by the International Electrotechnical Commission. An extra-low voltage system carries a low risk of dangerous electrical shock and allows for less costly power electronics components, cables, and wires, in order to maintain proper safety precautions. In addition, an extra-low voltage system improves the safety of human operators and does not require specialty high voltage training of vehicle service personnel.

In some embodiments, a single master controller is used to coordinate the functions of several of the power modules. In some embodiments, no master controller is used, and each local controller of each respective power module may control its individual functions. In such embodiments, each respective power module may sense the functions, such as input and output voltage, current, and/or power, of one or more of the other power modules, and adjust its functions accordingly. In some embodiments, an external master controller monitors the power modules, such as input and output voltage, current, phase, frequency, and/or power, battery charge state, etc. and issues commands to each of the local controllers of the respective power modules. In some embodiments, a local controller of one of the power modules acts as the master controller, and a separate, external master controller is not required. In the event that the local controller, which is acting as the master controller, becomes disabled or unavailable, then a second local controller of the power modules may automatically activate as the master controller.

The local controller in each power module may be configured to receive control signals from a master controller. The control signals may be configured to modify an input phase, an input frequency, and output power of the single-phase rectifier circuit, an output power of the multi-phase rectifier circuit, an output phase, an output frequency, and an output power of the inverter circuit, and an output power of the DC-to-DC converter circuit. The control signal transmitted to the local controller in each power module from the master controller may be a pulse-width modulation signal. The pulse-width modulation signal may have a range of duty cycles. In some embodiments, the input power of the single-phase rectifier circuit or the multi-phase rectifier circuit and the output power of the inverter circuit may be single-phase or multi-phase operating at 30 V or 40 V.

In some embodiments, the single-phase AC power signal originates from a wall outlet. The wall outlet may operate with any suitable voltage and frequency standard from around the world such as the North American standard of 120 volts at a frequency of 60 Hz or the European standard of 240 volts at a frequency of 50 Hz. The plug and socket used for the wall outlet may be any suitable plug and socket set by national standards such as the CEE 7 standard socket and plug defined by the International Commission on the Rules for the Approval of Electrical Equipment as well as the NEMA type 1 and type 5 as defined by the National Electrical Manufacturers Association.

In some aspects, a method for providing power for a vehicle may comprise receiving a throttle input from a user at a master controller, generating a throttle control signal based on the throttle input, transmitting the throttle control signal using a system communication bus to a local controller in each power module, activating a first power module to deliver electrical power to the electric motor based on the throttle control signal, detecting whether an output power of the first power module exceeds a threshold, and activating a second power module to deliver electrical power to the electric motor based on the throttle control signal if the output power of the first power module exceeds the threshold. The threshold power level may be a percentage of the maximum output power of the first power module between 0 and 100%, such as 75% of the maximum output power of the first power module.

In some embodiments, the throttle input may be generated by any suitable input mechanism, such as an accelerator pedal depressed by the user in an automobile. The amount of pressure applied to the pedal by the user may cause the pedal to be depressed proportional to the amount of pressure applied by the user. The throttle input may be determined by the degree to which the pedal is depressed. Other methods of inputting a throttle input may be contemplated, as would be understood by those of skill in the art.

In some embodiments, the throttle control signal may be a pulse-width modulation signal with a duty cycle between 0 and 100% proportional to the ratio of the throttle input to a maximum throttle input. In some embodiments, the throttle control signal may be a DC voltage signal between a minimum control voltage level (such as 0 volts) and a maximum control voltage level. The throttle control signal may adjust the switching frequency of the inverter circuit of the first power module and the second power module to adjust an output current and/or voltage of the first power module and the second power module.

In some embodiments, the method for providing power for a vehicle may comprise generating a second throttle control signal and transmitting the second throttle control signal to the second power module. The second throttle control signal may be a pulse-width modulation signal. The duty cycle of the first throttle control signal and the duty cycle of the second throttle control signal may add up to be between 0 and 100% proportional to the ratio of the throttle input to a maximum throttle input. In some embodiments, the second throttle control signal may be a DC voltage signal between 0 volts and half of the maximum control voltage level. The voltage of the first throttle control signal and the second throttle control signal may add up to be between 0 volts and the maximum control voltage level.

In some embodiments, the method for providing power for a vehicle may comprise transmitting a control signal to the first power module to reduce the output power of the first power module if the output power of the first power module exceeds the threshold power level. In some embodiments, the master controller may transmit the control signal to the first power module to reduce the output power of the first power module. The output power of the first power module may be detected by the local controller of the first power module. In some embodiments, the output power of the first power module may be detected by the master controller.

Variations and modifications will occur to those of skill in the art after reviewing this disclosure. The disclosed features may be implemented, in any combination and subcombinations (including multiple dependent combinations and subcombinations), with one or more other features described herein. The various features described or illustrated above, including any components thereof, may be combined or integrated in other systems. Moreover, certain features may be omitted or not implemented.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

In some aspects, an electric vehicle power system may comprise two or more electrically connected power modules connected to a system communication bus. Each power module may comprise a rechargeable battery electrically connected to a DC bus, an inverter circuit electrically connected to the DC bus, and at least one of a single-phase rectifier circuit electrically connected to the DC bus or a multi-phase rectifier circuit electrically connected to the DC bus. A local controller configured to send control signals may be connected to the rechargeable battery, the inverter circuit, and the at least one of the single-phase rectifier circuit or the multi-phase rectifier circuit. The single-phase rectifier circuit may be configured to convert a single-phase AC power signal into the DC voltage of the DC bus. The multi-phase rectifier circuit may be configured to convert a multi-phase AC power signal into the DC voltage of the DC bus.

Figure 1:
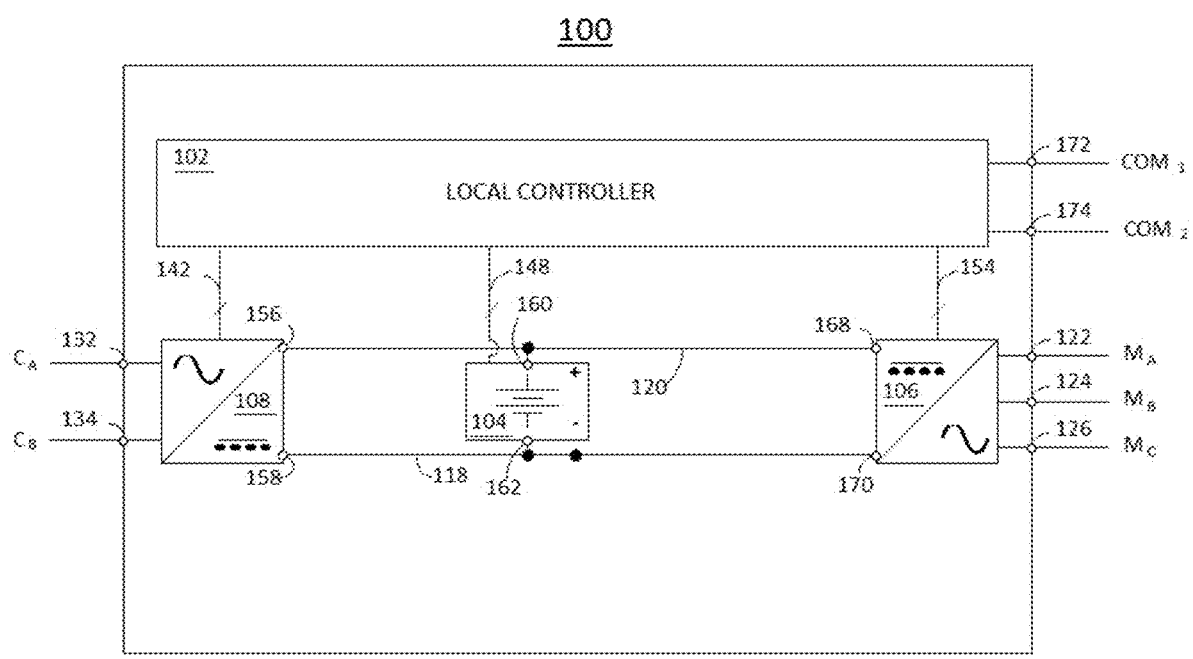
FIG. 1 shows an illustrative example of an extra low voltage motor drive unit with a single-phase rectifier in accordance with some embodiments of the disclosure.

FIG. 1 shows an illustrative example of an extra low voltage motor drive unit 100 with a single-phase rectifier in accordance with some embodiments of the disclosure. The extra low voltage motor drive unit 100 includes a local controller 102, a battery module 104, an inverter circuit 106, and a single-phase rectifier circuit 108. The local controller 102 may be connected to a system communication bus 172. In some embodiments, the local controller 102 may also be connected to a second, redundant system communication bus 174, although the redundant system communication bus 174 may not be included in some embodiments. The battery module 104 may be connected to the local controller 102 via connection 148. The battery module 104 may have a cathode input/output 160 connected to the positive side of the DC bus 120 and an anode input/output 162 connected to the negative side of the DC bus 118. The inverter circuit 106 may be connected to the local controller 102 via connection 154. The inverter circuit's positive DC bus input 168 may be connected to the positive side of the DC bus 120 and the inverter circuit's negative DC bus input 170 may be connected to the negative side of the DC bus 118. The inverter circuit 106 may convert the DC voltage of the DC bus into a three-phase AC output with outputs 122, 124, and 126. The single-phase rectifier circuit 108 may be connected to the local controller 102 via connection 142. The single-phase rectifier circuit 108 may convert a single-phase power signal from connections 132 and 134 into a DC voltage across the positive side of the DC bus 120 and the negative side of the DC bus 118. The positive DC output 156 of the single-phase rectifier circuit 108 may be connected to the positive side of the DC bus 120. The negative DC output 158 of the single-phase rectifier circuit 108 may be connected to the negative side of the DC bus 118.

In some embodiments, the local controller 102 may send and receive status and sensor input/output signals from the battery module 104, the inverter circuit 106, and the single-phase rectifier circuit 108 using connections 148, 154, and 142, respectively. The status and sensor input/output signals may be the voltage, current, and temperature sensor readings of the battery module 104, the inverter circuit 106, and the single-phase rectifier circuit 108. In some embodiments, the status and sensor input/output signal may be the DC voltage across the positive side of the DC bus 120 and the negative side of the DC bus 118. In some embodiments, the status and sensor input/output signals may be the input current, input voltage, output current, or output voltage of the inverter circuit 106. In some embodiments, the status and sensor input/output signals may be the input voltage, input current, or output current of the single-phase rectifier circuit 108.

In some embodiments, the local controller 102 may generate and transmit one or more control signals to the battery module 104, inverter circuit 106, and single-phase rectifier circuit 108 using connections 148, 154, and 142, respectively. The control signal transmitted to the local controller in each extra low voltage motor drive unit from the master controller may be a pulse-width modulation signal. The pulse-width modulation signal may have a range of duty cycles. In some embodiments, the one or more control signals transmitted to the local controller 102 in each extra low voltage motor drive unit 100 from the master controller may provide AC phase and frequency to support synchronization of inverter circuits 106 and single-phase rectifier circuits 108.

In some embodiments, the battery module 104 may have a battery stack circuit connected to the cathode input/output 160 connected to the positive side of the DC bus 120 and connected to the anode input/output 162 connected to the negative side of the DC bus 118. The battery stack circuit may have more than one individual batteries connected in series, parallel, or in a combination of series and parallel. The individual batteries may be any suitable battery type, such as lead acid, lithium-ion, lithium polymer, nickel-cadmium, and nickel-metal hydride. In some embodiments, the local controller 102 may be configured to transmit a control signal to the battery module 104 using connection 148. The control signal may control the charging and discharging rate of the battery module 104. An exemplary battery module is described further below in relation to FIG. 6.

In some embodiments, the inverter circuit 106 may be configured to convert a DC voltage of the DC bus into an AC power signal. The inverter circuit 106 may be any suitable DC-to-AC power converter, such as a single-phase inverter or multi-phase inverter. In some embodiments, the inverter circuit 106 may have an output operating voltage of 30 V or 40 V. The AC power signal may be three-phase with outputs 122, 124, and 126. It will be understood that the outputs 122, 124, and 126 are shown in FIG. 1 for illustrative purposes only, and that any suitable output or output lines may be utilized to deliver the AC power signal. In some embodiments, the local controller 102 may be configured to transmit a control signal to the inverter circuit 106 using connection 154. The control signal may control the power output of the inverter circuit 106. In some embodiments, the inverter circuit 106 may be configured to convert an AC power signal into a DC voltage of the DC bus. This allows the inverter circuit 106 to operate as a bi-directional circuit in order to convert the AC power signal from connections 122, 124, and 126 into the DC voltage of the DC bus using connections 168 and 170. For instance, the inverter may operate "in reverse" to convert any excess mechanical energy to charge the battery. This occurs frequently while operating a vehicle during breaking. The kinetic energy of breaking the car may be recovered through the electric motor, converted by the inverter circuit 106, and used to charge the batteries.

In some embodiments, the single-phase rectifier circuit 108 may be any suitable AC-to-DC single-phase power converter, such as a half-wave rectifier, a full-wave center-tapped rectifier, or a full-wave bridge rectifier, configured to convert a single-phase AC power signal into the DC voltage of the DC bus. In some embodiments, the local controller 102 may be configured to transmit a control signal to the single-phase rectifier circuit 108 using connection 142. The control signal may control the output power of the single-phase rectifier circuit 108. In some embodiments, the single-phase AC power originates from a wall outlet using connections 132 and 134. The wall outlet may operate with any suitable voltage and frequency standard from around the world such as the North American standard of 120 volts at a frequency of 60 Hz or the European standard of 240 volts at a frequency of 50 Hz. The plug and socket used for the wall outlet may be any suitable plug and socket set by national standards such as the CEE 7 standard socket and plug defined by the International Commission on the Rules for the Approval of Electrical Equipment as well as the NEMA type 1 and type 5 as defined by the National Electrical Manufacturers Association. In some embodiments, the DC bus voltage across the across the positive side of the DC bus 120 and the negative side of the DC bus 118 may be below 50 volts. An operating voltage below 50 volts is defined as extra-low voltage by the International Electrotechnical Commission. An extra-low voltage system carries a low risk of dangerous electrical shock and allows for less costly power electronics components, cables, and wires, in order to maintain proper safety precautions. In some embodiments, the single-phase rectifier circuit 108 may be configured to convert the DC voltage of the DC bus into a single-phase AC power signal. The single-phase AC power signal may be delivered to the electric grid using connections 132 and 134.

Figure 2:
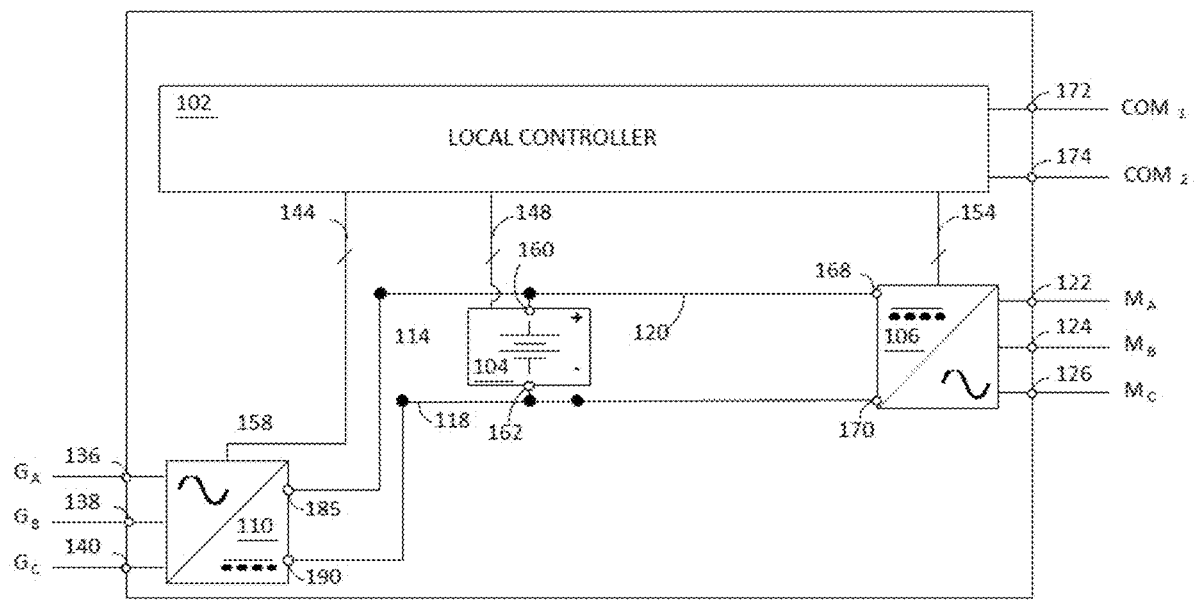
FIG. 2 shows an illustrative example of an extra low voltage motor drive unit with a multi-phase rectifier in accordance with some embodiments of the disclosure.

FIG. 2 shows an illustrative example of an extra low voltage motor drive unit 200 with a multi-phase rectifier in accordance with some embodiments of the disclosure. The extra low voltage motor drive unit 200 includes a local controller 102, a battery module 104, an inverter circuit 106, and a multi-phase rectifier circuit 110. The local controller 102 may be connected to a system communication bus 172. In some embodiments, the local controller 102 may also be connected to a second, redundant system communication bus 174, although the redundant system communication bus 174 may not be included in some embodiments. The battery module 104 may be connected to the local controller 102 via connection 148. The battery module 104 may have a cathode input/output 160 connected to the positive side of the DC bus 120 and an anode input/output 162 connected to the negative side of the DC bus 118. The inverter circuit 106 may be connected to the local controller 102 via connection 154. The inverter circuit's positive DC bus input 168 may be connected to the positive side of the DC bus 120 and the inverter circuit's negative DC bus input 170 may be connected to the negative side of the DC bus 118. The inverter circuit 106 may convert the DC voltage of the DC bus into a three-phase AC output with outputs 122, 124, and 126. The multi-phase rectifier circuit 110 may be connected to the local controller 102 via connection 158. The multi-phase rectifier circuit 110 may convert a multi-phase power signal from connections 136, 138, and 140 into the DC voltage across the positive side of the DC bus 120 and the negative side of the DC bus 118. The positive DC output 185 of the multi-phase rectifier circuit 110 may be connected to the positive side of the DC bus 120. The negative DC output 190 of the multi-phase rectifier circuit 110 may be connected to the negative side of the DC bus 118.

In some embodiments, the multi-phase rectifier circuit 110 may be any suitable AC-to-DC multi-phase power converter, such as a three-phase half-wave rectifier, a three-phase full-wave center-tapped rectifier, a three-phase full-wave bridge rectifier, or a twelve-pulse bridge rectifier, configured to convert a multi-phase AC power signal from connections 136, 138, and 140 into the DC voltage across the positive side of the DC bus 120 and the negative side of the DC bus 118. In some embodiments, the multi-phase AC power originates from a generator using connections 136, 138, and 140. The generator may operate with any suitable voltage and frequency standard and may be any suitable AC generator such as an induction generator. In some embodiments, the local controller 102 may be configured to transmit a control signal to the multi-phase rectifier circuit 110 using connection 158. The control signal may control the input power of the multi-phase rectifier circuit 110.

Figure 3:
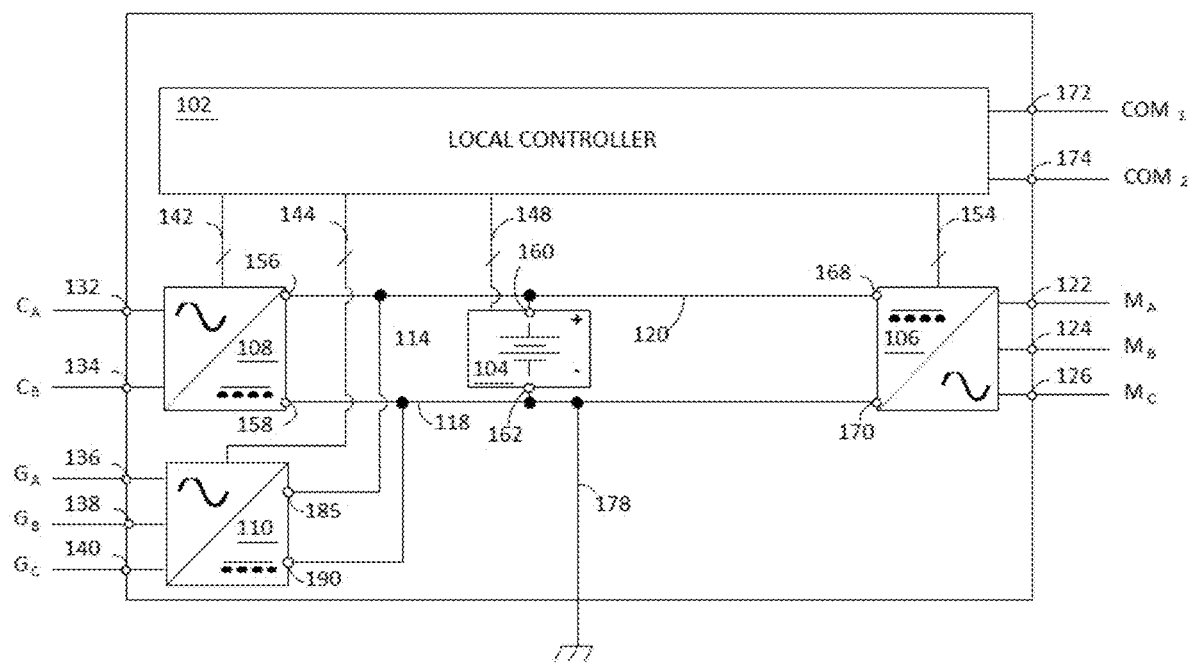
FIG. 3 shows an illustrative example of an extra low voltage motor drive unit with a single-phase rectifier and a multi-phase rectifier in accordance with some embodiments of the disclosure.

FIG. 3 shows an illustrative example of an extra low voltage motor drive unit 300 with a single-phase rectifier and a multi-phase rectifier in accordance with some embodiments of the disclosure. The extra low voltage motor drive unit 300 includes a local controller 102, a battery module 104, an inverter circuit 106, a single-phase rectifier circuit 108, and a multi-phase rectifier circuit 110. The local controller 102 may be connected to a system communication bus 172. In some embodiments, the local controller 102 may also be connected to a second, redundant system communication bus 174, although the redundant system communication bus 174 may not be included in some embodiments. The battery module 104 may be connected to the local controller 102 via connection 148. The battery module 104 may have a cathode input/output 160 connected to the positive side of the DC bus 120 and an anode input/output 162 connected to the negative side of the DC bus 118. The inverter circuit 106 may be connected to the local controller 102 via connection 154. The inverter circuit's positive DC bus input 168 may be connected to the positive side of the DC bus 120 and the inverter circuit's negative DC bus input 170 may be connected to the negative side of the DC bus 118. The inverter circuit 106 may convert the DC voltage of the DC bus into a three-phase AC output with outputs 122, 124, and 126. The single-phase rectifier circuit 108 may be connected to the local controller 102 via connection 142. The single-phase rectifier circuit 108 may convert a single-phase power signal from connections 132 and 134 into a DC voltage across the positive side of the DC bus 120 and the negative side of the DC bus 118. The positive DC output 156 of the single-phase rectifier circuit 108 may be connected to the positive side of the DC bus 120. The negative DC output 158 of the single-phase rectifier circuit 108 may be connected to the negative side of the DC bus 118. The multi-phase rectifier circuit 110 may be connected to the local controller 102 via connection 158. The multi-phase rectifier circuit 110 may convert a multi-phase power signal from connections 136, 138, and 140 into the DC voltage across the positive side of the DC bus 120 and the negative side of the DC bus 118. The positive DC output 185 of the multi-phase rectifier circuit 110 may be connected to the positive side of the DC bus 120. The negative DC output 190 of the multi-phase rectifier circuit 110 may be connected to the negative side of the DC bus 118.

Figure 4:
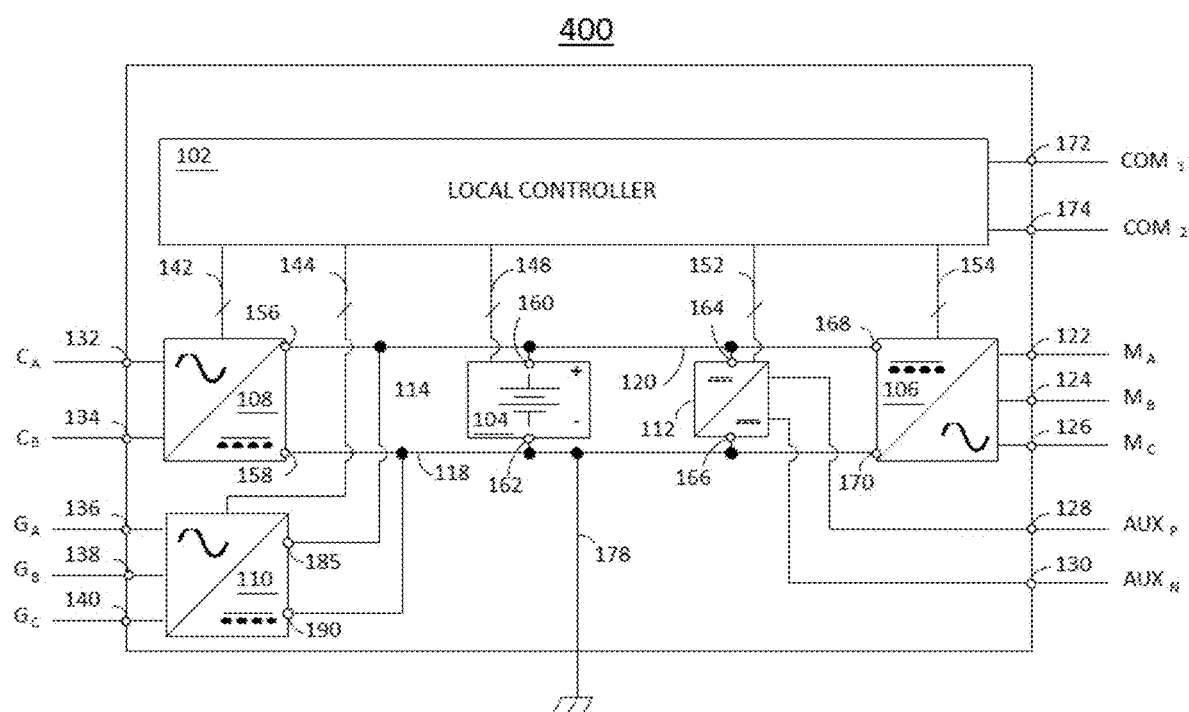
FIG. 4 shows an illustrative example of an extra low voltage motor drive unit with a single-phase rectifier, a multi-phase rectifier, and a DC to DC converter in accordance with some embodiments of the disclosure.

FIG. 4 shows an illustrative example of an extra low voltage motor drive unit 400 with a single-phase rectifier, a multi-phase rectifier, and a DC to DC converter in accordance with some embodiments of the disclosure. The extra low voltage motor drive unit 400 includes a local controller 102, a battery module 104, an inverter circuit 106, a single-phase rectifier circuit 108, a multi-phase rectifier circuit 110, and a DC-to-DC converter circuit 112. The local controller 102 may be connected to a system communication bus 172. In some embodiments, the local controller 102 may also be connected to a second, redundant system communication bus 174, although the redundant system communication bus 174 may not be included in some embodiments. The battery module 104 may be connected to the local controller 102 via connection 148. The battery module 104 may have a cathode input/output 160 connected to the positive side of the DC bus 120 and an anode input/output 162 connected to the negative side of the DC bus 118. The inverter circuit 106 may be connected to the local controller 102 via connection 154. The inverter circuit's positive DC bus input 168 may be connected to the positive side of the DC bus 120 and the inverter circuit's negative DC bus input 170 may be connected to the negative side of the DC bus 118. The inverter circuit 106 may convert the DC voltage of the DC bus into a three-phase AC output with outputs 122, 124, and 126. The single-phase rectifier circuit 108 may be connected to the local controller 102 via connection 142. The single-phase rectifier circuit 108 may convert a single-phase power signal from connections 132 and 134 into a DC voltage across the positive side of the DC bus 120 and the negative side of the DC bus 118. The positive DC output 156 of the single-phase rectifier circuit 108 may be connected to the positive side of the DC bus 120. The negative DC output 158 of the single-phase rectifier circuit 108 may be connected to the negative side of the DC bus 118. The multi-phase rectifier circuit 110 may be connected to the local controller 102 via connection 158. The multi-phase rectifier circuit 110 may convert a multi-phase power signal from connections 136, 138, and 140 into the DC voltage across the positive side of the DC bus 120 and the negative side of the DC bus 118. The positive DC output 185 of the multi-phase rectifier circuit 110 may be connected to the positive side of the DC bus 120. The negative DC output 190 of the multi-phase rectifier circuit 110 may be connected to the negative side of the DC bus 118. The DC-to-DC converter circuit 112 may be connected to the local controller 102 via connection 152. The positive side of the DC bus 120 may be connected to the positive DC voltage input 164 of the DC-to-DC converter circuit 112. The negative side of the DC bus 118 may be connected to the negative DC voltage input 166 of the DC-to-DC converter circuit. The DC-to-DC converter circuit 112 may convert a DC power signal from the DC bus voltage at connections 164 and 166 at one voltage level to another voltage level at auxiliary power bus connections 128 and 130.

In some embodiments, the DC-to-DC converter circuit 112 may be any suitable DC-to-DC converter, such as a buck converter, a buck-boost converter, a boost-buck converter, a push-pull converter, or a full bridge converter, configured to convert a DC power signal from one voltage level to another voltage level. In some embodiments, the local controller 102 may be configured to transmit a control signal to the DC-to-DC converter circuit 112 using connection 152. The control signal may control the output power of the DC-to-DC converter circuit 112.

The embodiments of extra low power motor drive units 100, 200, 300, and 400 described in FIGS. 1, 2, 3, and 4 above may represent modules for powering an electric vehicle. Electric vehicles use an electric propulsion system using electric motors. The electric vehicle may be a plug-in electric vehicle, a hybrid electric vehicle, and plug-in hybrid electric vehicle. Plug-in electric vehicles are motor vehicles that rely on charging from an external source of electrical power to drive electric motors in the electric vehicle. Extra low power motor drive unit 100 may be used as a power module in a plug-in electric vehicle to deliver power to the electric motors in the electric vehicle. Hybrid electric vehicles are motor vehicles that rely on charging from an internal combustion engine to drive electric motors. Extra low power motor drive unit 200 may be used as a power module in a hybrid electric vehicle to deliver power to the electric motors. Plug-in hybrid electric vehicles are motor vehicles that use an internal combustion engine and an external source of electrical power to charge rechargeable batteries in an electric vehicle which drive the electric motors in the electric vehicle. Extra low power motor drive unit 300 may be used as a power module in a plug-in hybrid electric vehicle to deliver power to the electric motors. Extra low power motor drive unit 400 may be used as a power module in a plug-in hybrid electric vehicle to deliver power to the electric motors as well as provide auxiliary power to the electric system components throughout the vehicle. The extra low power motor drive units 100, 200, 300, and 400 may be configured in series, parallel, or in a combination to deliver the optimal power necessary without using rechargeable batteries connected in series to achieve the required operating voltage as used in conventional systems, usually in excess of 400 V. The modular configurations using extra low power motor drive units 100, 200, 300, and 400 may mitigate the costs associated with costly cables and wires required in conventional high-voltage power electronics. The modular configurations using extra low power motor drive units 100, 200, 300, and 400 may also allow for the entire system to continue functioning at a lower power output and reduced operating range if one of the modules failed. Additionally, a modular configurations using extra low power motor drive units 100, 200, 300, and 400 may allow for increased customizability as the electric vehicles range can be increased with the addition of individual modules to upgrade the power system.

Figure 5:
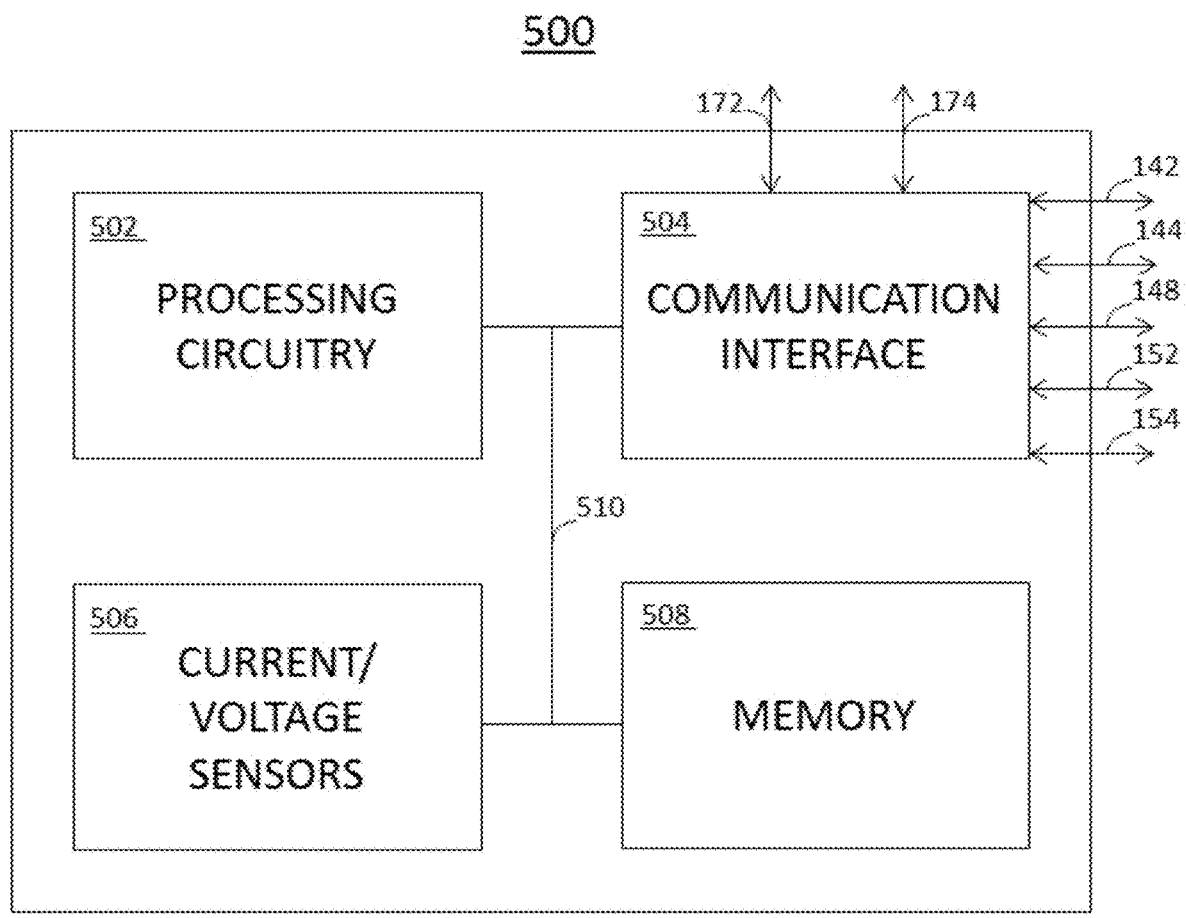
FIG. 5 shows an illustrative example of a local controller with processing circuitry, communication interface, memory, and current/voltage sensors in accordance with some embodiments of the disclosure.

FIG. 5 shows an illustrative example of a local controller 500 with processing circuitry, communication interface, memory, and current/voltage sensors in accordance with some embodiments of the disclosure. The local controller 500 includes processing circuitry 502, communication interface 504, current/voltage sensors 506, and memory 508. The local controller 500 may be substantially similar to corresponding component 102, depicted in FIG. 1 and described above. In some embodiments, the local controller 500 may allow for storage and receipt of various system inputs, and may allow for processing of these inputs to determine various system outputs. The processing circuitry 502 may process, communicate, and control inputs and outputs of local controller 500. The communication interface 504 may receive and transmit signals from external connections. The current/voltage sensors 506 may detect and measure current and voltage levels throughout local controller 500. The memory 508 may store data received from the communication interface 504 and processed using processing circuitry 502. The processing circuitry 502, communication interface 504, current/voltage sensors 506, and memory 508 may all be coupled by way of connection 510. The communication interface 504 may be connected to a system communication bus 172. In some embodiments, the communication interface 504 may also be connected to a second, redundant system communication bus 174, although the redundant system communication bus 174 may not be included in some embodiments. In some embodiments, the communication interface 504 may be connected to various components of the extra low voltage motor drive units 100, 200, 300, and 400. These components may include a single-phase rectifier circuit 108, a multi-phase rectifier circuit 110, a battery module 104, a DC-to-DC converter circuit 120, and an inverter circuit 106. These components may be connected to the communication interface by way of connections 142, 144, 148, 152, and 154.

In some embodiments, the communication interface 504 may comprise any suitable hardware for receiving and transmitting signals using connections 172, 174, 142, 144, 148, 152, and 154 to various components of the extra low power motor drive units 100, 200, 300, and 400. In some embodiments, the inputs of the communication interface may comprise a throttle input using system communication bus 172 and redundant system communication bus 174 as well as input data from the single-phase rectifier circuit 108, multi-phase rectifier circuit 110, battery module 104, DC-to-DC converter circuit 120, and inverter circuit 106. The input data from the single-phase rectifier circuit 108 may include the operating voltage and frequency as well as the input single-phase AC power and the output DC power to the DC bus. The input data from the multi-phase rectifier circuit 110 may include the operating voltage and frequency as well as the input multi-phase AC power and the output DC power to the DC bus. The input data from the battery module 104 may include the state of charge as well as the input DC power from the DC bus and output DC power to the DC bus. In some embodiments, the state of charge may be calculated using processing circuitry 502 based on measurements from the battery module 104. The input data from the DC-to-DC converter circuit 120 may include the operating voltage and frequency as well as the input DC power from the DC bus and output DC power to the auxiliary connections 128 and 130. The input data from the inverter circuit 106 may include the operating voltage and frequency as well as the input DC power from the DC bus and the output AC power to the electric motors.

In some embodiments, the current/voltage sensors 506 may comprise any suitable hardware for detecting and measuring current and voltage levels. Detecting and measuring current and voltage levels are both needed to calculate input and output power. The current/voltage sensors 506 may be located inside the local controller 500 in order to detect and measure all of the current and voltage signals from the various components of the extra low power motor drive units 100, 200, 300, and 400. In certain embodiments, some or all of the current/voltage sensors 506 may be located externally to the local controller and/or inside one or more components of extra low voltage motor drive units 100, 200, 300, and 400 or along power connections inside the extra low voltage motor drive units 100, 200, 300, and 400. In certain embodiments, the current and voltage signals are obtained through communication interface 504 via connection 510. In certain embodiments, the current/voltage sensors 506 may be located at every connection 172, 174, 142, 144, 148, 152, and 154 in order to locally detect and measure current and voltage levels at each connection. In certain embodiments, the current and voltage signals may be measured periodically at a certain frequency and transmitted to memory 508 for storage. In certain embodiments, the current and voltage signals may be measured in response to an instruction from the processing circuitry 502 and transmitted to memory 508 for storage.

In some embodiments, the memory 508 may comprise any suitable hardware capable of storing data over time from the processing circuitry 502, communication interface 504, and current/voltage sensors 506. In certain embodiments, the memory 508 may store past and present current and voltage measurements from current/voltage sensor 506. In certain embodiments, the memory 508 may store past and present throttle inputs from the communication interface 504. In certain embodiments, the memory 508 may store algorithms and functions for use by the processing circuitry 502. The memory 508 may comprise dynamic random access memory, static access memory, magnetic storage devices, flash memory, or other suitable memory storage devices or combinations thereof.

In some embodiments, the processing circuitry 502 may comprise any suitable hardware capable of being configured to process, communicate, and control inputs and outputs of local controller 500. In some embodiments, the processing circuitry 502 may comprise one or more microprocessors, microcontrollers, digital signal processors, programmable logic devices, and integrated circuits. In some embodiments, the processing circuitry 502 may be configured to access memory 508 process stored input data and determine an appropriate algorithm or function based on the input data to use to determine output data to be transmitted to the components of extra low power motor drive units 100, 200, 300 and 400. As would be understood by one of ordinary skill in the art, other stored data from the memory 508 may be used by the processing circuitry 502, and may be used in a variety of algorithms or functions. Furthermore, it would be understood by one of ordinary skill in the art that processing circuitry 502 may be configured to use a variety of algorithms or functions to determine other outputs not previously described.

Figure 6:
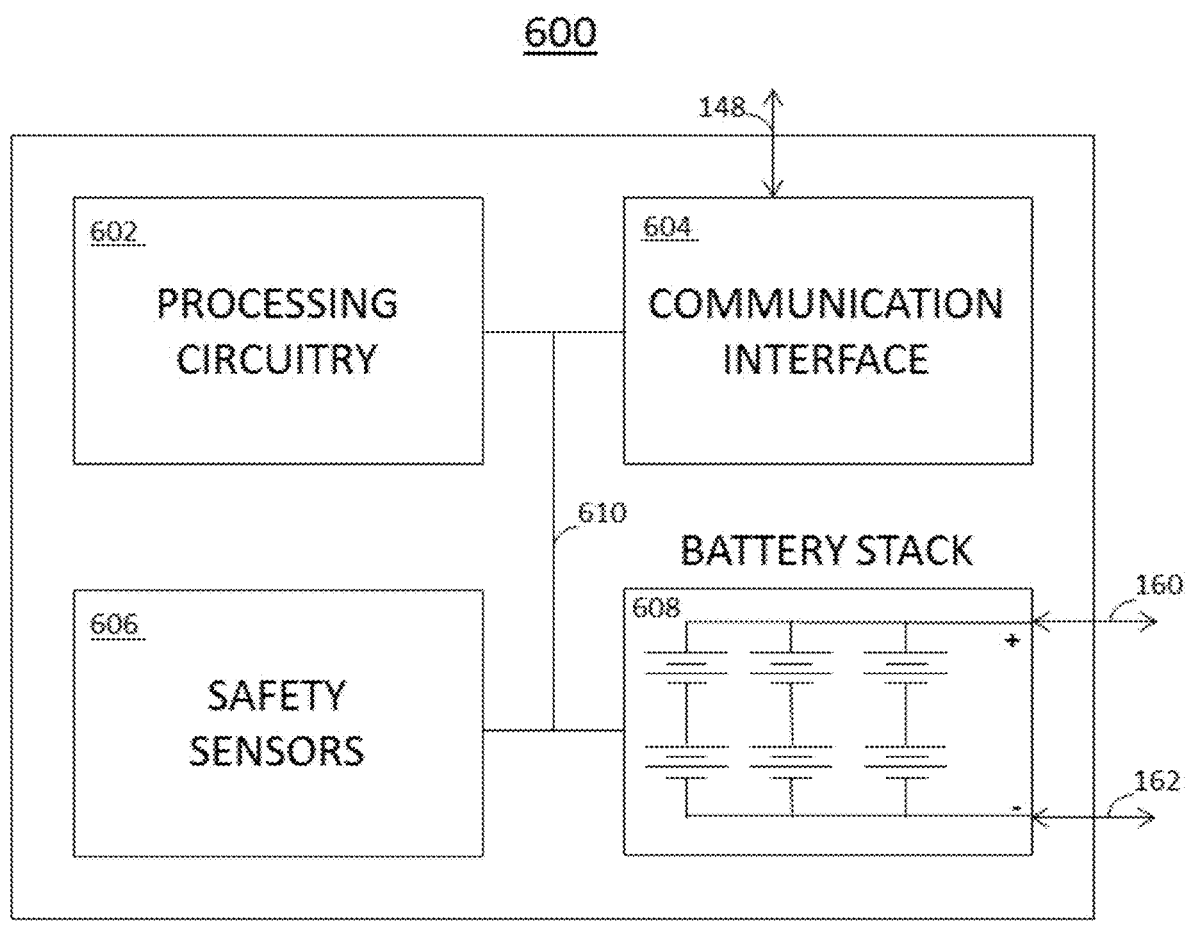
FIG. 6 shows an illustrative example of a battery module with processing circuitry, communication interface, safety sensors, and a battery stack in accordance with some embodiments of the disclosure.

FIG. 6 shows an illustrative example of a battery module 600 with processing circuitry, communication interface, safety sensors, and a battery stack in accordance with some embodiments of the disclosure. In some embodiments, the battery module 600 may include processing circuitry 602, communication interface 604, safety sensors 606, and battery stack circuit 608. The battery module 600 may be substantially similar to corresponding component 104, depicted in FIG. 1 and described above. The processing circuitry 602 may be substantially similar to corresponding component 502, depicted in FIG. 5 and described above. In some embodiments, the battery module 600 may not include processing circuitry 602 and may depend on processing circuitry 502 in the local controller 500 for processing. The communication interface 604 may be substantially similar to corresponding component 504, depicted in FIG. 5 and described above. The safety sensors 606 may measure and monitor the temperature inside the battery stack circuit 608. In some embodiments, the safety sensors 606 may be substantially similar to current/voltage sensor 506 and may detect and measure all of the current and voltage signals from the various components of the extra low power motor drive units 100, 200, 300, and 400. The battery stack circuit 608 may store and supply electric power to the DC bus. The processing circuitry 602, communication interface 604, safety sensors 606, and battery stack circuit 608 may all be coupled by way of connection 610. The communication interface 604 may be connected to the local controller 500 using connection 148. The battery stack circuit 608 may have a cathode input/output 160 connected to the positive side of the DC bus 120 and an anode input/output 162 connected to the negative side of the DC bus 118.

In some embodiments, the safety sensors 606 may comprise any suitable thermal sensor for measuring and monitoring the temperature inside the battery stack 608. The safety sensors 606 may prevent further current flow in the battery stack if the temperature inside the battery stack 608 spikes quickly above a threshold temperature. The threshold temperature may depend on the battery type of the individual batteries in the battery stack 608. In some embodiments, the safety sensor 606 may comprise any suitable hardware for detecting and measuring current and voltage levels.

In some embodiments, the battery stack circuit 608 may have more than one individual batteries connected in series, parallel, or in a combination. The individual batteries may be any suitable battery type, such as lead acid, lithium-ion, lithium polymer, nickel-cadmium, and nickel-metal hydride. In some embodiments, the local controller 500 may be configured to transmit a control signal to the battery module 600 using connection 148. The control signal may control the charging and discharging rate of the battery module 600.

Figure 7:
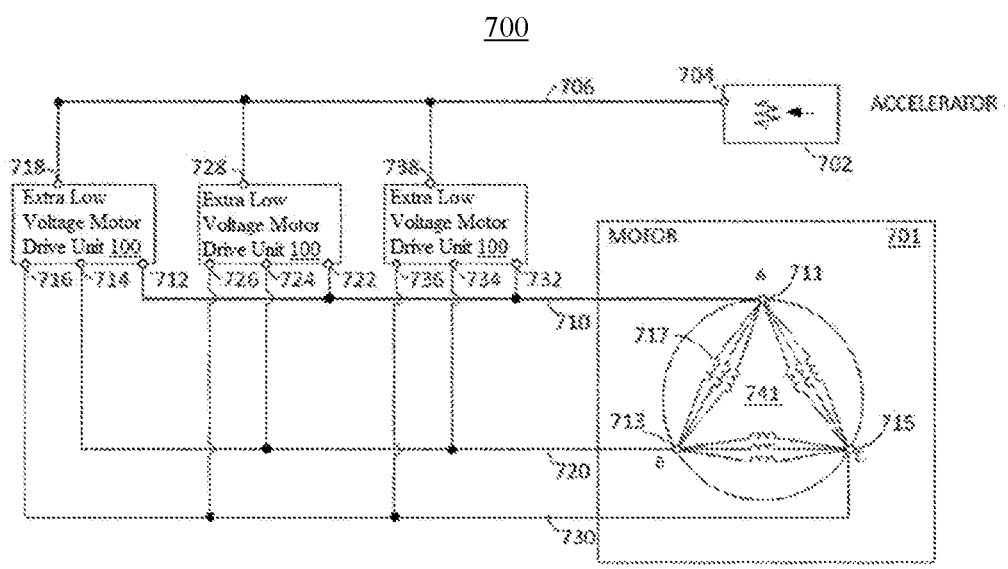
FIG. 7 shows an illustrative example of an electric vehicle power system configuration for powering an electric motor with three extra low voltage motor drive units in accordance with some embodiments of the disclosure.

Extra low voltage motor drive unit 100 may be used as a power module in a plug-in, hybrid, or plug-in hybrid electric vehicle to deliver power to the electric motors in the electric vehicle. FIG. 7 shows an illustrative example of an electric vehicle power system configuration 700 in an electric vehicle for powering an electric motor 701 with three extra low voltage motor drive units 100 in accordance with some embodiments of the disclosure. The electric vehicle power system configuration 700 includes an electric motor configuration 701, an accelerator 702, and three extra low voltage motor drive units 100. The electric motor configuration 701 may comprise an electric motor 741. The electric motor 741 may convert AC power into mechanical power. The electric motor 741 may be connected to the three extra low voltage motor drive units 100 with connections 710, 720, and 730. Connections 710, 720, and 730 may deliver the converted three-phase AC power to the electric motor 741. The accelerator 702 may generate a throttle input by any suitable input mechanism, such as an accelerator pedal depressed by the user in an automobile. The accelerator 702 may be connected to the three extra low voltage motor drive units 100 with connection 706 via connector 704. The extra low voltage motor drive units 100 may be connected to the accelerator 702 with connection 706 via connectors 718, 728, and 738. The throttle input from the accelerator 702 is transmitted to the communication interface 504, stored in the memory 508, and processed by the processing circuitry 502 in local controller 500 of extra low voltage motor drive unit 100. The extra low voltage motor drive unit 100 may be connected to the electric motor 741 with connections 710, 720, and 730 via connectors 712, 714, and 716, respectively. Connectors 722 and 732 may be substantially similar to connector 712 as described above. Connectors 724 and 734 may be substantially similar to connector 714 as described above. Connectors 726 and 736 may be substantially similar to connector 716 as described above. Based on the throttle input from the accelerator 702, the processing circuitry 502 in local controller 500 of extra low voltage motor drive unit 100 transmits a control signal using communication interface 504 to the inverter circuit 106 to deliver a corresponding AC power to the electric motor 741.

In some embodiments, the electric motor 701 may be any suitable electric motor such as, an induction motor, a slip motor, a polyphase cage motor, a polyphase wound motor, a two-phase servo motor, a split-phase motor, a squirrel-cage motor, a shaded-pole motor, a synchronous electric motor, a polyphase synchronous motor, a single-phase synchronous motor, a hysteresis synchronous motor, and a brushless electric motor.

In some embodiments, the electric motor 701 may deliver an AC power signal to the extra low voltage motor drive unit 100 using connections 710, 720, and 730. The AC power signal would be generated by the electric motor 701 in response to a reduced throttle input from accelerator 702. The electric motor 701 may convert the kinetic energy recovered from the vehicle to an AC power signal. In some embodiments, the inverter circuit 106 in the extra low voltage motor drive units 100 may convert the AC power signal into a DC voltage of the DC bus.

The modular approach of electric vehicle power system configuration 700 allows for high uniform efficiencies and uniform torque across a wide range of output power ranges. Additionally, electric vehicle power system configuration 700 is optimally fault tolerant with no single point of failure, resulting in high reliability. For example, if one of the battery modules 718, 728, or 738 fails, then the remainder of the functioning battery modules may continue to provide electric power to the motor and allow for operation of the vehicle at a lower power level. Electric vehicle range and battery life is extended compared to conventional systems because each battery module 600 can be charged and discharged at differential rates in order to actively balance the state of charge across the various modules. In addition, an extra low voltage power system configuration improves safety for vehicle occupants, first responders, and service technicians.

Figure 8:
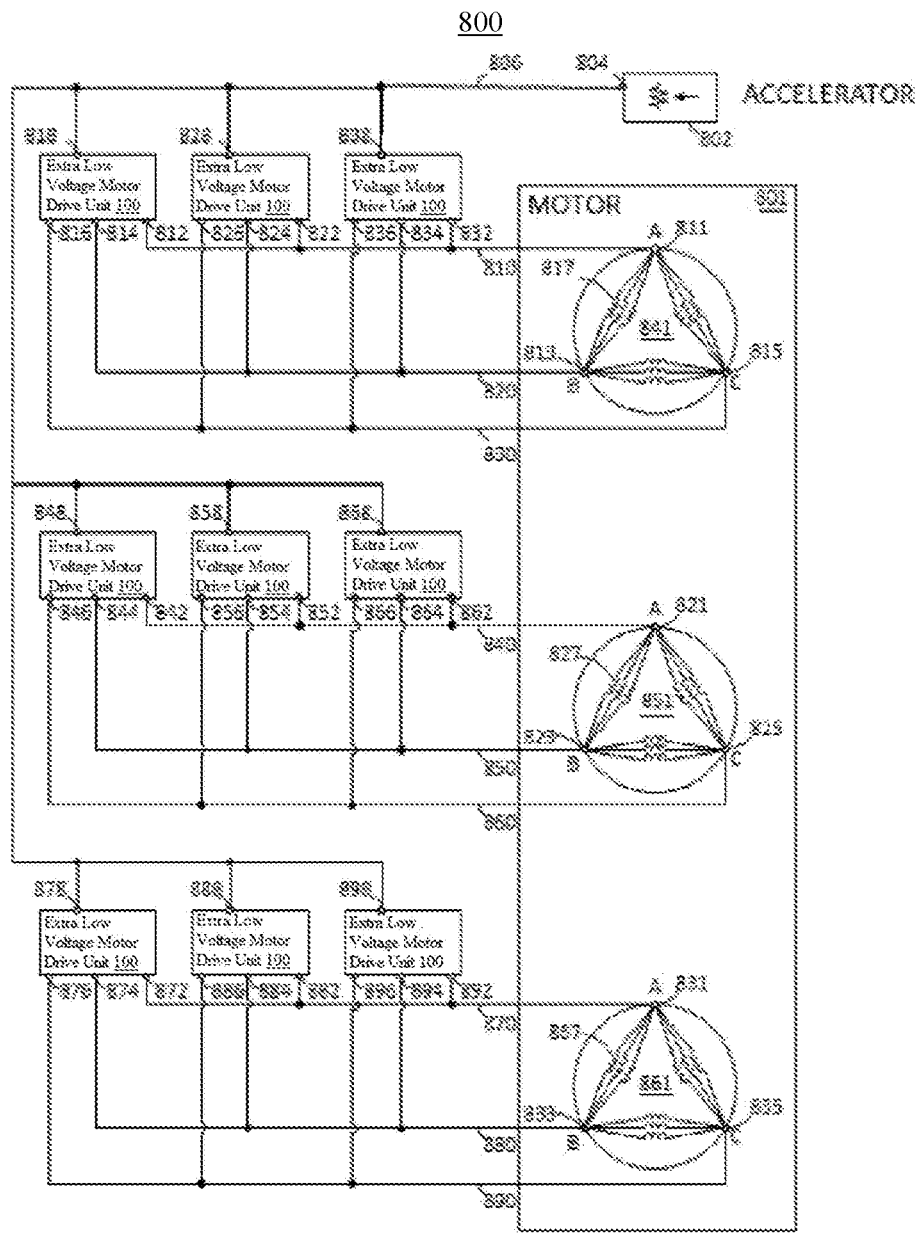
FIG. 8 shows an illustrative example of an electric vehicle power system configuration for powering three electric motors with nine extra low voltage motor drive units in accordance with some embodiments of the disclosure.

The modular approach discussed herein would allow for increased customizability as the electric vehicles range and torque can be increased with the addition of individual modules and electric motors to upgrade the plug-in electric vehicle. A larger configuration of extra low voltage motor drive units 100 may be used as power modules in an upgraded plug-in, hybrid, or plug-in hybrid electric vehicle to deliver power to multiple electric motors in the electric vehicle. FIG. 8 shows another illustrative example of an electric vehicle power system configuration 800 for powering three electric motors 801 in an electric vehicle with nine extra low voltage motor drive units 100 in accordance with some embodiments of the disclosure. The electric vehicle power system configuration 800 includes an electric motor configuration 801, an accelerator 802, and nine extra low voltage motor drive units 100. The electric motor configuration 801 may comprise three electric motors 841, 851, and 861. The electric motors 841, 851, and 861 may be substantially similar to corresponding component 741, depicted in FIG. 7 and described above. The electric motor 841 may be connected to three extra low voltage motor drive units 100 with connections 810, 820, and 830. The electric motor 851 may be connected to three extra low voltage motor drive units 100 with connections 840, 850, and 860. The electric motor 861 may be connected to three extra low voltage motor drive units 100 with connections 870, 880, and 890. The accelerator 802 may be substantially similar to corresponding component 702, depicted in FIG. 7 and described above. The accelerator 802 may be connected to the nine extra low voltage motor drive units 100 with connection 806 via connector 804. The extra low voltage motor drive units 100 may be connected to the accelerator 802 with connection 806 via connectors 818, 828, 838, 848, 858, 868, 878, 888, and 898. The throttle input from the accelerator 802 is transmitted to the communication interface 504, stored in the memory 508, and processed by the processing circuitry 502 in local controller 500 of extra low power motor drive unit 100. The extra low voltage motor drive unit 100 may be connected to the electric motor 841 with connections 810, 820, and 830 via connectors 812, 814, and 816, respectively. Connectors 822 and 832 may be substantially similar to connector 812 as described above. Connectors 824 and 834 may be substantially similar to connector 814 as described above. Connectors 826 and 836 may be substantially similar to connector 816 as described above. Electric motors 851 and 861 may be substantially similar to electric motor 841 as described above. Connectors 842, 852, 862, 872, 882, and 892 may be substantially similar to connector 812 as described above. Connectors 844, 854, 864, 874, 884, and 894 may be substantially similar to connector 814 as described above. Connectors 846, 856, 866, 876, 886, and 896 may be substantially similar to connector 812 as described above. Based on the throttle input from the accelerator 802, the processing circuitry 502 in local controller 500 of extra low voltage motor drive unit 100 transmits a control signal using communication interface 504 to the inverter circuit 106 to deliver a corresponding AC power to the electric motors 841, 851, and 861.

Figure 9:
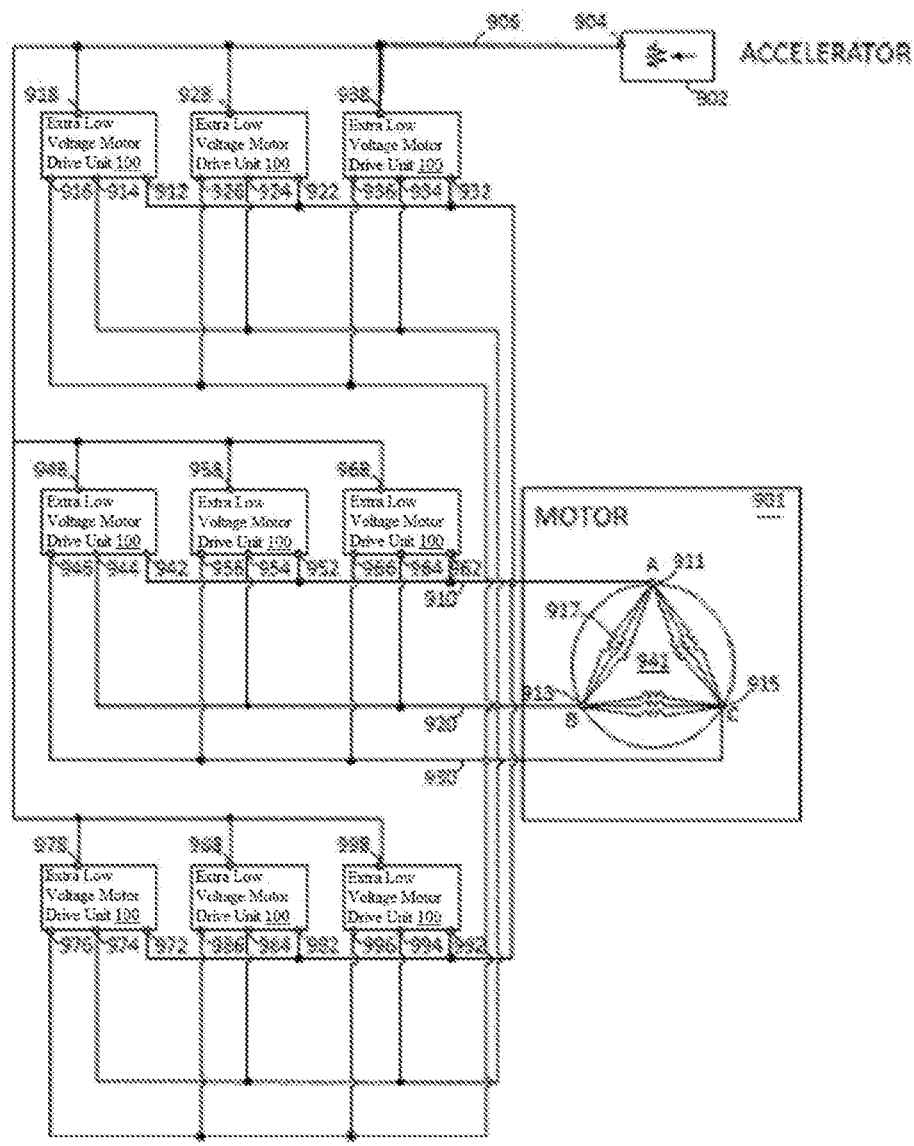
FIG. 9 shows an illustrative example of an electric vehicle power system configuration for powering an electric motor with nine extra low voltage motor drive units in accordance with some embodiments of the disclosure.

FIG. 9 shows an illustrative example of an electric vehicle power system configuration 900 for powering an electric motor 901 with nine extra low voltage motor drive units 100 in accordance with some embodiments of the disclosure. The electric vehicle power system configuration 900 includes an electric motor configuration 901, an accelerator 902, and nine extra low voltage motor drive units 100. The electric motor configuration 901 may comprise one electric motor 941. The electric motor 941 may be connected to nine extra low voltage motor drive units 100 with connections 910, 920, and 930. The accelerator 902 may be connected to the nine extra low voltage motor drive units 100 with connection 906 via connector 904. The extra low voltage motor drive units 100 may be connected to the accelerator 902 with connection 906 via connectors 918, 928, 938, 948, 958, 968, 978, 988, and 998. The extra low voltage motor drive unit 100 may be connected to the electric motor 941 with connections 910, 920, and 930 via connectors 912, 914, and 916, respectively. Connectors 922, 932, 942, 952, 962, 972, 982, and 992 may be substantially similar to connector 912 as described above. Connectors 924, 934, 944, 954, 964, 974, 984, and 994 may be substantially similar to connector 914 as described above. Connectors 926, 936, 946, 956, 966, 976, 986, and 996 may be substantially similar to connector 916 as described above.

Figure 10:
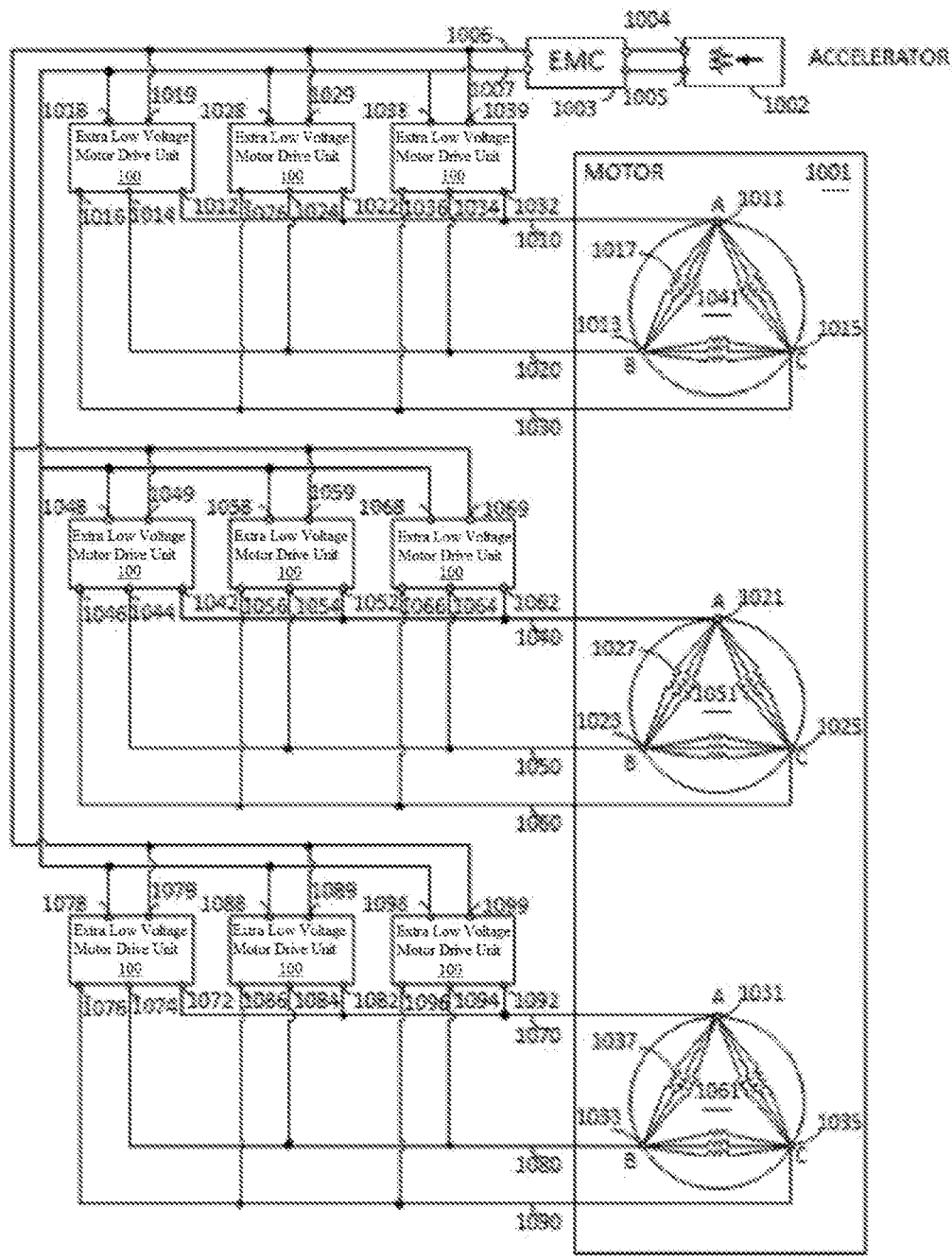
FIG. 10 shows an illustrative example of an electric vehicle power system configuration for powering three electric motors with nine extra low voltage motor drive units and an external master controller in accordance with some embodiments of the disclosure.

FIG. 10 shows an illustrative example of an electric vehicle power system configuration 1000 for powering three electric motors 1001 with nine extra low voltage motor drive units 100 and an external master controller 1003 in accordance with some embodiments of the disclosure. The electric vehicle power system configuration 1000 includes an electric motor configuration 1001, an accelerator 1002, an external master controller 1003, and nine extra low voltage motor drive units 100. The electric motor configuration 1001 may comprise three electric motors 1041, 1051, and 1061. The electric motor 1041 may be connected to three extra low voltage motor drive units 100 with connections 1010, 1020, and 1030. The electric motor 1051 may be connected to three extra low voltage motor drive units 100 with connections 1040, 1050, and 1060. The electric motor 1061 may be connected to three extra low voltage motor drive units 100 with connections 1070, 1080, and 1090. The accelerator 1002 may be connected the external master controller 1003 with connection 1004. The external master controller 1003 may be connected to the nine extra low voltage motor drive units 100 with connection 1006. The extra low voltage motor drive units 100 may be connected to the external master controller 1003 with connection 1006 via connectors 1018, 1028, 1038, 1048, 1058, 1068, 1078, 1088, and 1098. In some embodiments, the accelerator 1002 may also be connected to the external master controller 1003 with a redundant connection 1005, although the redundant connection 1005 may not be included in some embodiments. In some embodiments, the external master controller 1003 may also be connected to the nine extra low voltage motor drive units with a redundant connection 1007, although the redundant connection 1007 may not be included in some embodiments. In some embodiments, the extra low voltage motor drive units 100 may also be connected to the external master controller 1003 with a redundant connection 1007 via redundant connectors 1019, 1029, 1039, 1049, 1059, 1069, 1079, 1089, and 1099, although the redundant connectors 1019, 1029, 1039, 1049, 1059, 1069, 1079, 1089, and 1099 may not be included. The extra low voltage motor drive unit 100 may be connected to the electric motor 1041 with connections 1010, 1020, and 1030 via connectors 1012, 1014, and 1016, respectively. Connectors 1022 and 1032 may be substantially similar to connector 1012 as described above. Connectors 1024 and 1034 may be substantially similar to connector 1014 as described above. Connectors 1026 and 1036 may be substantially similar to connector 1016 as described above. Electric motors 1051 and 1061 may be substantially similar to electric motor 1041 as described above. Connectors 1042, 1052, 1062, 1072, 1082, and 1092 may be substantially similar to connector 1012 as described above. Connectors 1044, 1054, 1064, 1074, 1084, and 1094 may be substantially similar to connector 1014 as described above. Connectors 1046, 1056, 1066, 1076, 1086, and 1096 may be substantially similar to connector 1012 as described above.

In some embodiments, the external master controller 1003 may send and receive status and sensor input/output signals from local controllers 500 of extra low voltage motor drive units 100. In some embodiments, the external master controller 1003 may generate and transmit one or more control signals to the local controllers 500 of extra low voltage motor drive units 100. The one or more control signals may be pulse-width modulation signals. The pulse-width modulation signals may have a range of duty cycles.

Figure 11:
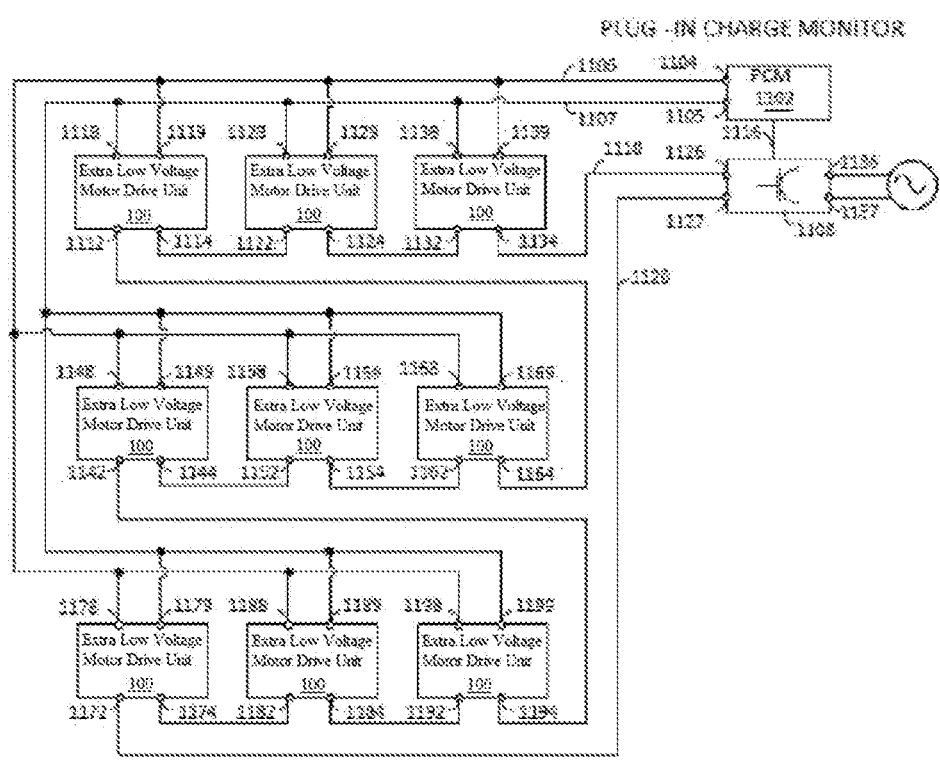
FIG. 11 shows an illustrative example of an electric vehicle power system configuration for charging from an electric grid in accordance with some embodiments of the disclosure.

FIG. 11 shows an illustrative example of an electric vehicle power system configuration 1100 for charging from an electric grid in accordance with some embodiments of the disclosure. The electric vehicle power system configuration 1100 includes a plug-in charge monitor 1102, a charging receptacle 1108, and nine extra low voltage motor drive units 100. The plug-in charge monitor 1102 may be connected to the nine extra low voltage motor drive units 100 with connection 1106 via connector 1104. The extra low voltage motor drive units 100 may be connected to the plug-in charge monitor 1102 with connection 1106 via connectors 1118, 1128, 1138, 1148, 1158, 1168, 1178, 1188, and 1198. In some embodiments, the plug-in charge monitor 1102 may also connected to the extra low voltage motor drive units 100 with a redundant connection 1107 via redundant connector 1105, although the redundant connection 1107 and connector 1005 may not be included in some embodiments. In some embodiments, the extra low voltage motor drive units 100 may also be connected to the plug-in charge monitor with a redundant connection 1107 via redundant connectors 1119, 1129, 1139, 1149, 1159, 1169, 1179, 1189, and 1199, although the redundant connectors 1119, 1129, 1139, 1149, 1159, 1169, 1179, 1189, and 1199 may not be included in some embodiments. The charging receptacle 1108 may be connected to the extra low voltage motor drive units with connection 1110 and 1120 via connectors 1126 and 1127, respectively. The charging receptacle 1108 may be connected to a wall outlet with connectors 1136 and 1137. The nine extra low voltage motor drive units 100 may be connected in series for charging from charging receptacle 1108. The extra low voltage motor drive units 100 may be connected to the charge with connections 1110 and 1120 via connectors 1134 and 1172, respectively. The series configuration may be accomplished by connecting connectors 1132 and 1124, 1122 and 1114, 1112 and 1164, 1162 and 1154, 1152 and 1144, 1142 and 1194, 1192 and 1184, and 1182 and 1174.

In some embodiments, the plug-in charge monitor 1102 may monitor the charge state of the battery module 600 during charging. The plug-in charge monitor 1102 may also control the current of the charging receptacle 1108 using connection 1116. As the charge state of the battery module 600 increases during charging, the plug-in charge monitor 1102 may send a current limit signal to the extra low voltage motor drive units 100 to balance the state of charge of the battery stack 608.

In some embodiments, the charging receptacle 1108 may accept AC power from any suitable electric vehicle charger, such as a level 1 household charger, level 2 business charger, and level 3 commercial charger. The level 1 household charger uses a standard AC 120 Volt household outlet. The level 2 business charger uses an AC 240 volt outlet. The level 3 commercial charger uses DC power.

Electric vehicle power system configuration 1100 may be used as a backup electric power source for powering the electric grid. In some embodiments, the charging receptacle 1108 may deliver AC power from the extra low voltage motor drive units 100 to the electric grid. The single-phase rectifier circuit 108 of the extra low voltage motor drive units may convert the DC voltage of the DC bus into a single-phase AC power signal. The single-phase AC power signal may be delivered to the single-phase rectifier circuit using connections 1110 and 1120.

Figure 12:
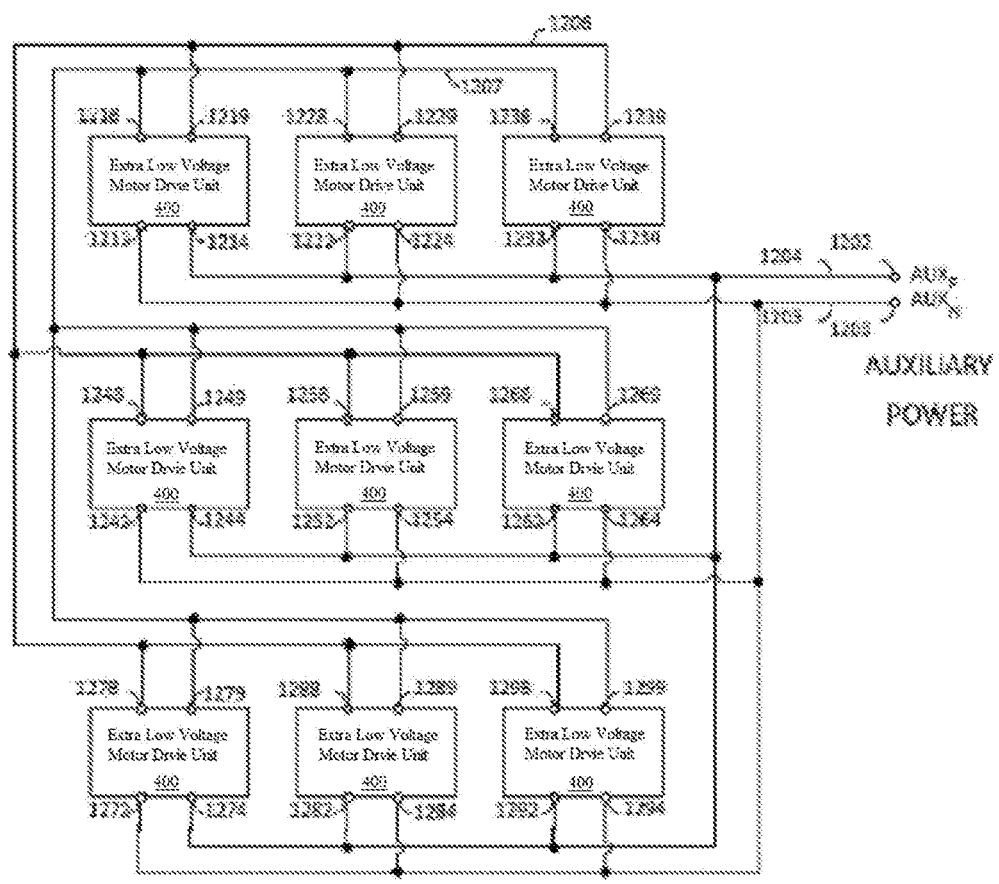
FIG. 12 shows an illustrative example of an electric vehicle power system configuration for auxiliary power in accordance with some embodiments of the disclosure.

Extra low voltage motor drive unit 400 may be used as a power module in a plug-in hybrid electric vehicle to deliver power to the electric motors as well as provide auxiliary power to the electric system components throughout the vehicle. FIG. 12 shows an illustrative example of an electric vehicle power system configuration 1200 for auxiliary power to the electric system components throughout the vehicle in accordance with some embodiments of the disclosure. The electric vehicle power system configuration 1200 includes nine extra low voltage motor drive units 400. The auxiliary power connectors 1202 and 1203 may be connected to the auxiliary power bus of the electric vehicle. The auxiliary power bus may power electric system components such as the headlights, audio system, and security system. The DC-to-DC converter circuit 112 of extra low voltage motor drive unit 400 converts the DC power signal from the voltage level of the DC bus to the voltage level of the auxiliary power bus of the electric vehicle.

In some embodiments, the auxiliary output power of each extra low voltage motor drive units 400 may be different. Each extra low voltage motor drive units 400 may output an auxiliary output power based on the total power used by the auxiliary electrical system and the state of charge level of the battery module 600. For example, when the electric vehicle is not in operation, the total power used by the auxiliary electrical system is very low and only one or more of the extra low voltage motor drive units 400 may deliver an auxiliary output power. In some embodiments, the extra low voltage motor drive unit 400 with the highest state of charge level may deliver an auxiliary output power when the electric vehicle is not in operation. Alternatively, when the electric vehicle is in operation, the total power used by the auxiliary electrical system increases depending on how many power electric system components are in operation, and more of the extra low voltage motor drive units 400 may contribute to the delivery of auxiliary output power to the auxiliary power bus. In some embodiments, high auxiliary output power may be needed when the headlights are turned on, the audio system is operating at a high volume setting, and when delivering instantaneous starting power to the combustion engine driving the generator on hybrid electric vehicles.

Figure 13:
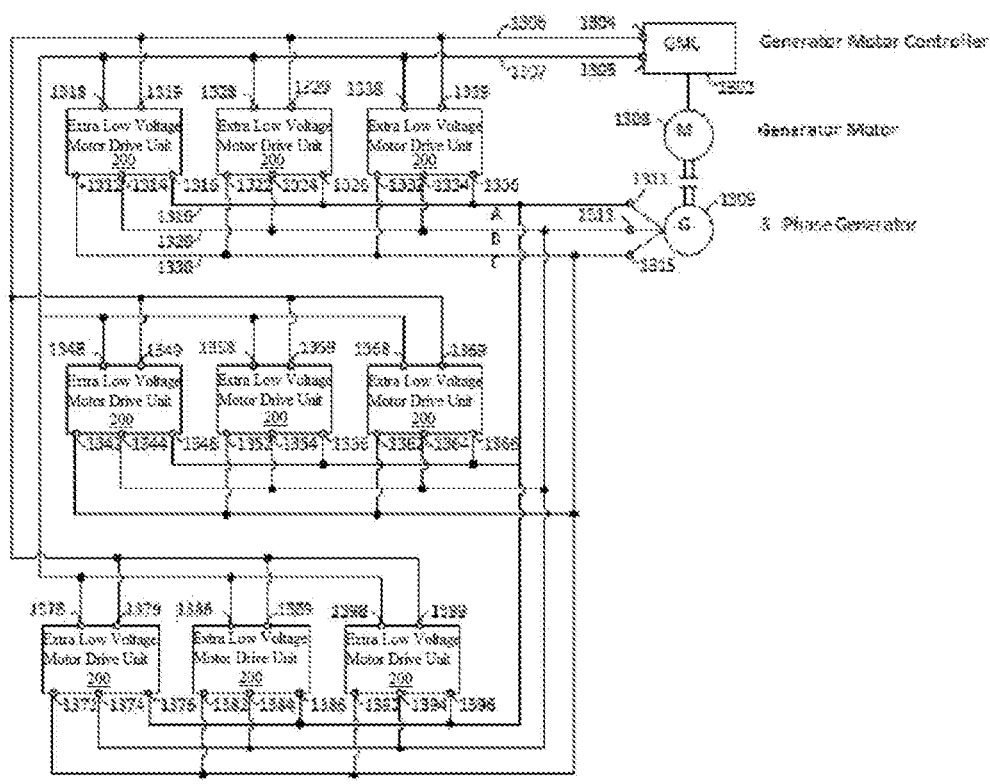
FIG. 13 shows an illustrative example of an electric vehicle power system configuration for charging from a generator motor in accordance with some embodiments of the disclosure.

Hybrid and plug-in hybrid electric vehicles use an internal combustion engine to charge the battery modules 600. FIG. 13 shows an illustrative example of an electric vehicle power system configuration 1300 in a hybrid electric vehicle for charging from a generator motor in accordance with some embodiments of the disclosure. The electric vehicle power system configuration 1300 includes a generator motor controller 1302, a generator motor 1308, a multi-phase generator 1309, and nine extra low voltage motor drive units 200. The generator motor controller may monitor the charge state of the battery module 600 during charging and may control the power output of the generator motor 1308. The generator motor 1308 may be any suitable internal combustion engine configured to convert fuel to motive power. The motive power may be converted to an AC multi-phase power signal by the multi-phase generator 1309 with output connections 1311, 1313, and 1315. The extra low voltage motor drive units 200 are connected in parallel to the multi-phase generators 1309 in order to deliver equal power to all of the extra low voltage motor drive units 200. In some embodiments, the generator motor controller 1302 controls the charging rate of each individual extra low voltage motor drive units 200. In some embodiments, the local controller 500 controls the charging rate of each individual extra low voltage motor drive units 200. In some embodiments, the master controller controls the charging rate of each individual extra low voltage motor drive units 200.

In some embodiments, the multi-phase generator 1309 may be any suitable AC generator, such as an induction generator, linear electric generator, and variable speed constant frequency generator, configured to convert the motive power from the generator motor 1308 to an AC multi-phase power signal.

Figure 14:
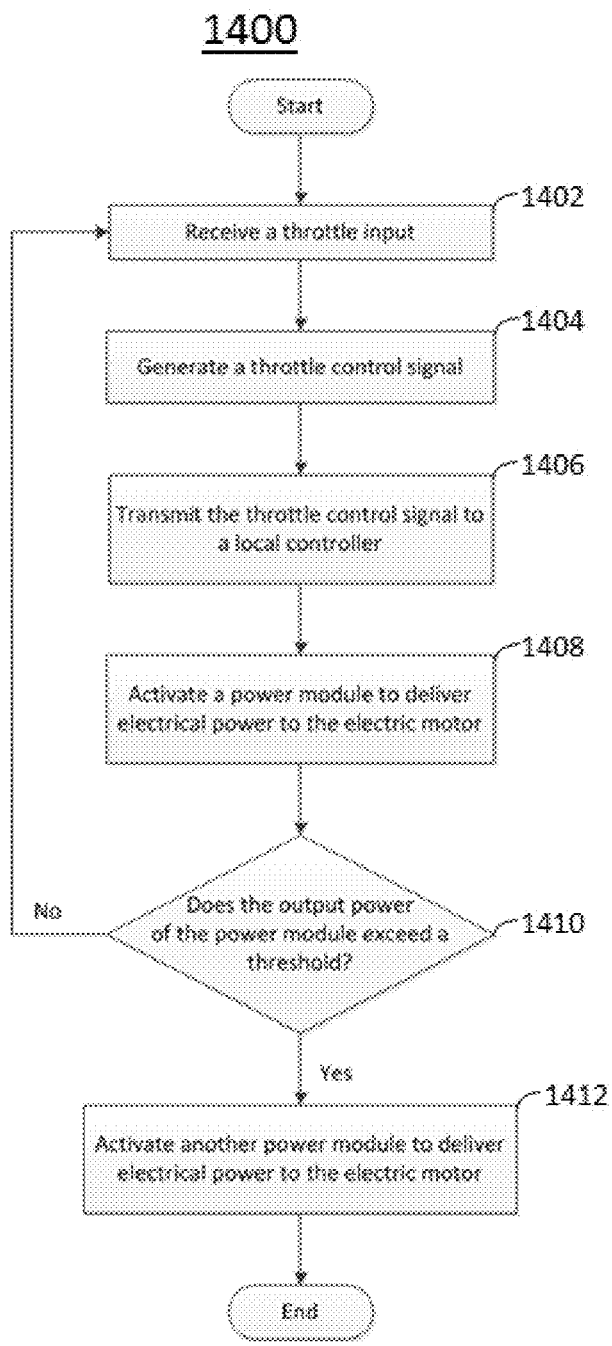
FIG. 14 shows an illustrative flowchart for delivering electrical power to an electric motor.

FIG. 14 shows an illustrative flowchart 1400 for delivering electrical power to an electric motor. Process 1400 includes receiving a throttle input at 1402, generating a throttle control signal at 1404, transmitting the throttle control signal to a local controller at 1406, activating a power module to deliver electrical power to the electric motor at 1408, determining if the output power of the power module exceeds a threshold at 1410, and, upon determining that the output power of the power module exceeds a threshold, activating another power module to deliver electrical power to the electric motor at 1412.

In some embodiments, the throttle input at step 1402 may be generated by any suitable input mechanism, such as an accelerator pedal depressed by the user in an automobile. The amount of pressure applied to the pedal by the user may cause the pedal to be depressed proportional to the amount of pressure applied by the user. The throttle input may be determined by the degree to which the pedal is depressed. Other methods of inputting a throttle input may be contemplated, as would be understood by those of skill in the art.

In some embodiments, generating a throttle control signal at step 1404 is based on the throttle input at step 1402. The generated throttle control signal at step 1404 may be a pulse-width modulation signal with a duty cycle between 0 and 100% proportional to the ratio of the throttle input to a maximum throttle input. In some embodiments, the throttle control signal may be a DC voltage signal between a minimum control voltage level (such as 0 volts) and a maximum control voltage level. The throttle control signal may adjust the switching frequency of the inverter circuit of the first power module and the second power module to adjust an output current and/or voltage of the first power module and the second power module.

In some embodiments, transmitting the throttle control signal to a local controller at step 1406 may be accomplished by transmitting the throttle control signal generated at step 1404 using a system communication bus to a local controller in each power module. The communication interface of the local controller may receive the throttle control signal from the system communication bus and transmit the throttle control signal in memory.

In some embodiments, activating a first power module to deliver electrical power to the electric motor at step 1408 is based on the throttle control signal generated at step 1404 and transmitted to the local controller of the first power module at step 1406. The processing circuitry of the local controller may retrieve the throttle control signal from memory and retrieve an algorithm from memory corresponding to the throttle control signal. The processing circuitry may generate and transmit a control signal to the inverter rectifier circuit of the power module using the communication interface of the local controller. The inverter rectifier circuit may deliver an AC power to the electric motor corresponding to the throttle control signal.

In some embodiments, the number of power modules activated may depend proportionally on the throttle input. As an illustrative example, inputs from 0-10% of maximum throttle may only cause the activation of a single power module, while higher inputs may cause a greater number of modules to become activated. In some embodiments, such as the steps described in FIG. 14, the local (or a master) controller will determine whether the power output of a single module has increased above a threshold power value. Once the power output of the module has reached the threshold power value, an additional power module may be activated. In some embodiments, the requested individual power output from the two modules may be reduced to achieve a smooth power acceleration. For example, once a first power module reaches 100% of its maximum power output, a second power module may be activated, but both the first and the second power module may be commanded to output only 50% of their maximum power output (or a proportionally lower power output) to provide a smooth power acceleration to the electric motor(s).

In some embodiments, determining whether an output power of the first power module exceeds a threshold at step 1410 is performed by processing circuitry in the local controller of the first power module. The threshold power level may be a percentage of the maximum output power of the first power module between 0 and 100%, such as 75% of the maximum output power of the first power module. The current and voltage sensors in the power module may monitor the output power of the first power module and store the output power in memory. The processing circuitry may retrieve the output power from the memory and retrieve an algorithm corresponding to the output power from memory. In some embodiments, the processing circuitry may generate and transmit a control signal to the master controller that indicates whether the output power of the first power module exceeds the threshold.

In some embodiments, in response to determining that the output power of the first power module exceeds a threshold at step 1410, activating a second power module to deliver electrical power to the electric motor based on the throttle control signal generated at step 1404 and transmitted to the local controller at step 1406 if the output power of the first power module exceeds the threshold. The processing circuitry of the local controller of the second power module may retrieve the throttle control signal from memory and retrieve an algorithm from memory corresponding to the throttle control signal. The processing circuitry of the local controller of the second power module may generate and transmit a control signal to the inverter rectifier circuit of the second power module using the communication interface of the local controller of the second power module. The inverter rectifier circuit of the second power module may deliver an AC power to the electric motor corresponding to the throttle control signal.

In some embodiments, in response to determining that the output power of the first power module exceeds a threshold at step 1410, the method for providing power for a vehicle may comprise generating a second throttle control signal and transmitting the second throttle control signal to the second power module. The second throttle control signal may be a pulse-width modulation signal. The duty cycle of the first throttle control signal and the duty cycle of the second throttle control signal may add up to be between 0 and 100% proportional to the ratio of the throttle input to a maximum throttle input. In some embodiments, the second throttle control signal may be a DC voltage signal between 0 volts and half of the maximum control voltage level. The voltage of the first throttle control signal and the second throttle control signal may add up to be between 0 volts and the maximum control voltage level.

In some embodiments, in response to determining that the output power of the first power module exceeds a threshold at step 1410, the method for providing power for a vehicle may comprise transmitting a control signal to the first power module to reduce the output power of the first power module if the output power of the first power module exceeds the threshold power level. In some embodiments, the master controller may transmit the control signal to the first power module to reduce the output power of the first power module. The output power of the first power module may be detected by the local controller of the first power module. In some embodiments, the output power of the first power module may be detected by the master controller.

Figure 15:
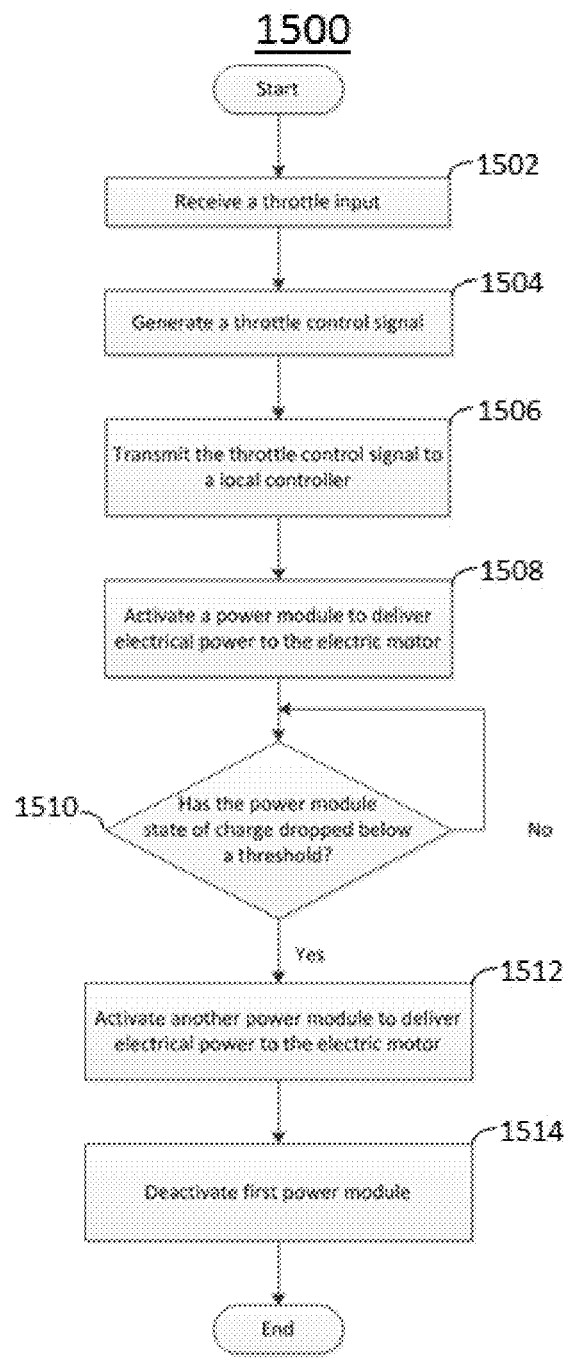
FIG. 15 shows an illustrative flowchart for switching an active extra low voltage motor drive unit.

FIG. 15 shows an illustrative flowchart 1500 for switching an active extra low voltage motor drive unit. Process 1500 includes receiving a throttle input at 1502, generating a throttle control signal at 1504, transmitting the throttle control signal to a local controller at 1506, activating a power module to deliver electrical power to the electric motor at 1508, determining if the power module state of charge has dropped below a threshold at 1510, upon determining that the power module state of charge has dropped below a threshold, activating another power module to deliver electrical power to the electric motor at 1512, and deactivating the first power module at 1514.

In some embodiments, the throttle input at step 1502 may be generated by any suitable input mechanism, such as an accelerator pedal depressed by the user in an automobile. The amount of pressure applied to the pedal by the user may cause the pedal to be depressed proportional to the amount of pressure applied by the user. The throttle input may be determined by the degree to which the pedal is depressed. Other methods of inputting a throttle input may be contemplated, as would be understood by those of skill in the art.

In some embodiments, generating a throttle control signal at step 1504 is based on the throttle input at step 1502. The generated throttle control signal at step 1504 may be a pulse-width modulation signal with a duty cycle between 0 and 100% proportional to the ratio of the throttle input to a maximum throttle input. In some embodiments, the throttle control signal may be a DC voltage signal between a minimum control voltage level (such as 0 volts) and a maximum control voltage level. The throttle control signal may adjust the switching frequency of the inverter circuit of the first power module and the second power module to adjust an output current and/or voltage of the first power module and the second power module.

In some embodiments, transmitting the throttle control signal to a local controller at step 1506 may be accomplished by transmitting the throttle control signal generated at step 1504 using a system communication bus to a local controller in each power module. The communication interface of the local controller may receive the throttle control signal from the system communication bus and transmit the throttle control signal in memory.

In some embodiments, activating a first power module to deliver electrical power to the electric motor at step 1508 is based on the throttle control signal generated at step 1504 and transmitted to the local controller of the first power module at step 1506. The processing circuitry of the local controller may retrieve the throttle control signal from memory and retrieve an algorithm from memory corresponding to the throttle control signal. The processing circuitry may generate and transmit a control signal to the inverter rectifier circuit of the power module using the communication interface of the local controller. The inverter rectifier circuit may deliver an AC power to the electric motor corresponding to the throttle control signal.

In some embodiments, determining whether the state of charge of the first power module dropped below a threshold at step 1510 is performed by processing circuitry in the local controller of the first power module. The threshold state of charge may be a percentage of the maximum state of charge of the first power module between 0 and 100%, such as 75% of the maximum state of charge of the first power module. The sensors in the battery module of the power module may be used by the local controller to monitor the state of charge of the battery stack in the battery module of the first power module and store the state of charge in memory. The processing circuitry of the local controller may retrieve the state of charge from the memory and retrieve an algorithm corresponding to the state of charge from memory. In some embodiments, the processing circuitry may generate and transmit a control signal to the master controller that indicates whether the state of charge of the first power module is below the threshold.

In some embodiments, in response to determining that the state of charge of the first power module dropped below a threshold at step 1510, activating a second power module to deliver electrical power to the electric motor based on the throttle control signal generated at step 1504 and transmitted to the local controller at step 1506 if the state of charge of the first power module dropped below a threshold. The processing circuitry of the local controller of the second power module may retrieve the throttle control signal from memory and retrieve an algorithm from memory corresponding to the throttle control signal. The processing circuitry of the local controller of the second power module may generate and transmit a control signal to the inverter rectifier circuit of the second power module using the communication interface of the local controller of the second power module. The inverter rectifier circuit of the second power module may deliver an AC power to the electric motor corresponding to the throttle control signal.

In some embodiments, deactivating the first power module at step 1514 may comprise transmitting a control signal to the first power module to deactivate the first power module. In some embodiments, the master controller may transmit the control signal to the first power module to deactivate the first power module. The processing circuitry of the local controller of the first power module may generate and transmit a control signal to the inverter rectifier circuit of the first power module using the communication interface of the local controller of the first power module.

The inverter rectifier circuit of the first power module may stop delivering an AC power to the electric motor.

In some embodiments, in response to determining that the state of charge of the first power module dropped below a threshold at step 1510, the method for providing power for a vehicle may comprise generating a second throttle control signal and transmitting the second throttle control signal to the second power module. The second throttle control signal may be a pulse-width modulation signal. The duty cycle of the first throttle control signal and the duty cycle of the second throttle control signal may add up to be between 0 and 100% proportional to the ratio of the throttle input to a maximum throttle input. In some embodiments, the second throttle control signal may be a DC voltage signal between 0 volts and half of the maximum control voltage level. The voltage of the first throttle control signal and the second throttle control signal may add up to be between 0 volts and the maximum control voltage level.

In some embodiments, in response to determining that the state of charge of the first power module dropped below a threshold at step 1510, the method for providing power for a vehicle may comprise transmitting a control signal to the first power module to reduce the output power of the first power module if the output power of the first power module exceeds the threshold power level. In some embodiments, the master controller may transmit the control signal to the first power module to reduce the output power of the first power module. The output power of the first power module may be detected by the local controller of the first power module. In some embodiments, the output power of the first power module may be detected by the master controller.

Figure 16:
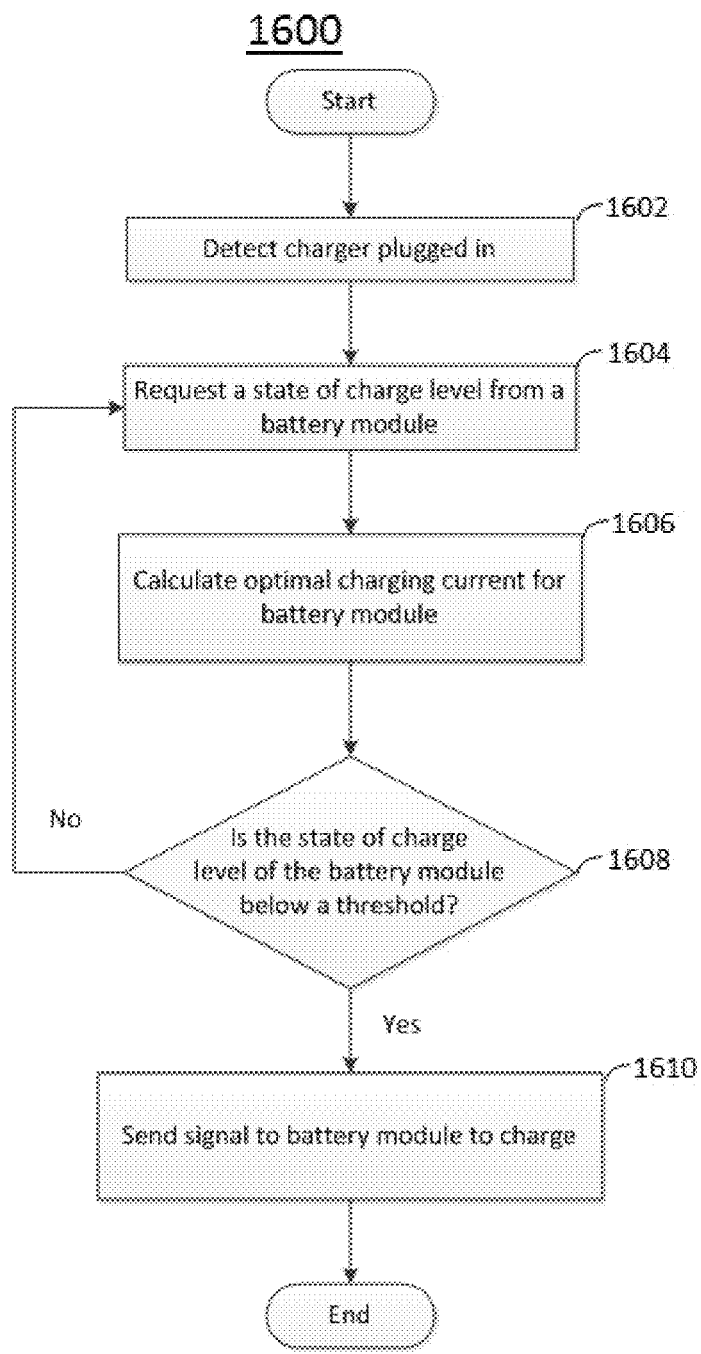
FIG. 16 shows an illustrative flowchart for charging a battery module.

FIG. 16 shows an illustrative flowchart 1600 for charging a battery module corresponding to a power module. Process 1600 includes detecting a charger plugged in at 1602, requesting a state of charge level for a battery module corresponding to a power module at 1604, calculating the optimal rate of charge for the battery module corresponding to a power module at 1606, determining if the state of charge level of the battery module corresponding to a power module is below a threshold at 1608, and, upon determining that the state of charge level of the battery module corresponding to a power module is below a threshold, sending a signal to the power module to charge the corresponding battery module at 1610.

In some embodiments, detecting that a charger is plugged into a charging receptacle at step 1602 comprises monitoring the current at the charger input with a plug-in charge monitor. In some embodiments, the plug-in charge monitor may monitor the charge state of the battery module during charging as well as control the current of the charging receptacle. In some embodiments, the charging receptacle may accept AC power from any suitable electric vehicle charger, such as a level 1 household charger, level 2 business charger, and level 3 commercial charger. The level 1 household charger uses a standard AC 120 Volt household outlet. The level 2 business charger uses an AC 240 volt outlet. The level 3 commercial charger uses DC power.

In some embodiments, requesting a state of charge level for a battery module corresponding to a power module at step 1604 comprises generating a control signal using processing circuitry at the master controller and transmitting a control signal to the local controller of the power module. In response to receiving the control signal, the local controller processing circuitry at the power module retrieves the current state of charge level from memory and transmits a control signal to the master controller corresponding to the state of charge level.

In some embodiments, calculating the optimal rate of charge for a battery module corresponding to a power module at step 1606 comprises retrieving an algorithm from memory at the master controller that corresponds to the state of charge level and calculating, using the algorithm and state of charge level, the optimal rate of charge for the battery module corresponding to a power module using processing circuitry at the master controller.

In some embodiments, determining if the state of charge level of a battery module corresponding to a power module is below a threshold at step 1608 is performed by processing circuitry in the local controller of the power module. The threshold state of charge level may be a percentage of the maximum state of charge level of the power module between 0 and 100%, such as 75% of the maximum state of charge level of the power module.

In some embodiments, in response to determining that the state of charge level of a battery module corresponding to a power module is below a threshold, sending a signal to the power module to charge the battery stack of the corresponding battery module at step 1610 may comprise transmitting a control signal to the power module to charge the corresponding battery module. In some embodiments, the master controller may transmit the control signal to a local controller of a power module to charge the battery stack of the corresponding battery module. As the charge state of the battery module increases during charging, the plug-in charge monitor may send a current limit signal to the power module to balance the state of charge of the battery stack.

In some embodiments, the charging receptacle may deliver AC power from the power module to the electric grid. The single-phase rectifier circuit of the power module may convert the DC voltage of the DC bus into a single-phase AC power signal. The single-phase AC power signal may be delivered to the single-phase rectifier circuit.

In some embodiments, the electric motor may deliver an AC power signal to the power module to charge the battery stack of the battery module. The AC power signal would be generated by the electric motor in response to a reduced throttle input from accelerator. The electric motor may convert the kinetic energy recovered from the vehicle to an AC power signal. In some embodiments, the inverter circuit in the power module may convert the AC power signal into a DC voltage of the DC bus. In some embodiments, the master controller may transmit the control signal to a local controller of a power module to charge the battery stack of the battery module. The rate of charge for each power module may be different depending on the state of charge of each power module and the proportional magnitude reduction of throttle input.

What is claimed is:

1. An electric vehicle power system comprising:
 a plurality of electrically connected power modules connected to a system communication bus and configured to be activated to deliver electrical power to an electric motor, each power module comprising:
 a rechargeable battery module electrically connected to a DC bus;
 an inverter circuit electrically connected to the DC bus, wherein the inverter circuit is configured to convert a DC voltage of the DC bus into an AC power signal, and wherein the inverter circuit is configured to be connected to an electric motor;
 at least one of:
 a single-phase rectifier circuit electrically connected to the DC bus, the single-phase rectifier circuit configured to convert a single-phase AC power signal into the DC voltage of the DC bus; or a multi-phase rectifier circuit electrically connected to the DC bus, the multi-phase rectifier circuit configured to convert a multi-phase AC power signal into the DC voltage of the DC bus; and a local controller connected to the rechargeable battery module, the inverter circuit, and the at least one of the single-phase rectifier circuit or the multi-phase rectifier circuit, the local controller configured to generate one or more control signals and determine whether an output power of one of the plurality of electrically connected power modules exceeds a threshold power level;

wherein another power module of the plurality of electrically connected power modules is activated to deliver electrical power to the electric motor in response to determining that the output power of one of the plurality of electrically connected power modules exceeds the threshold power level; and wherein the plurality of power modules are connected in parallel to at least one electric motor.

2. The system of claim 1, wherein each power module further comprises a DC to DC converter circuit electrically connected to the DC bus and to an auxiliary power bus.

3. The system of claim 1, wherein, for each of the plurality of power modules, the local controller is configured to detect at least one of: the DC voltage of the DC bus, an input voltage of the at least one of the single-phase rectifier circuit or the multi-phase rectifier circuit, an input current of the at least one of the single-phase rectifier circuit or the multi-phase rectifier circuit, an output current of the at least one of the single-phase rectifier circuit or the multi-phase rectifier circuit, an input current or voltage of the inverter circuit, and an output current or voltage of the inverter circuit.

4. The system of claim 1, wherein, for each of the plurality of power modules, the local controller is configured to transmit a control signal to the inverter circuit in order to control a power output of the inverter circuit.

5. The system of claim 4, wherein the control signal is a pulse-width modulation signal.

6. The system of claim 1, wherein, for each of the plurality of power modules, the local controller is configured to transmit a control signal to the at least one of the single-phase rectifier circuit or the multi-phase rectifier circuit to control an input power of the at least one of the single-phase rectifier circuit or the multi-phase rectifier circuit.

7. The system of claim 1, wherein the DC bus voltage of each of the plurality of power modules is below 50 volts.

8. The system of claim 1, wherein, for each of the plurality of power modules, the local controller is configured to receive control signals from a master controller, the control signals configured to modify at least one of an output power of the at least one of the single-phase rectifier circuit or the multi-phase rectifier circuit and an output power of the inverter circuit.

9. The system of claim 1, wherein the master controller is a local controller of one of the plurality of power modules.

10. The system of claim 1, wherein the single-phase AC power signal originates from one of a 120 volt AC wall outlet or a 240 volt AC wall outlet.

11. A method for providing power for a vehicle, the method comprising:

receiving, from a user at a master controller, a throttle input;

generating, based on the throttle input, a throttle control signal;

transmitting, using a system communication bus, the throttle control signal to a plurality of local controllers, each local controller located within one of a plurality of electrically connected power modules, each power module comprising:

a rechargeable battery module electrically connected to a DC bus;

an inverter circuit electrically connected to the DC bus, wherein the inverter circuit is configured to convert a DC voltage of the DC bus into an AC power signal, and wherein the inverter circuit is configured to be connected to an electric motor;

activating a first power module of the plurality of power modules to deliver electrical power to the electric motor based on the throttle control signal;

detecting whether an output power of the first power module exceeds a threshold power level;

in response to detecting that the output power of the first power module exceeds the threshold power level, activating a second power module of the plurality of electrically connected power modules to deliver electrical power to the electric motor based on the throttle control signal.

12. The method of claim 11, wherein the throttle input is generated by an accelerator pedal depressed by the user.

13. The method of claim 11, wherein the throttle control signal is a pulse width modulation signal with a duty cycle between 0 and 100% proportional to the ratio of the throttle input to a maximum throttle input.

14. The method of claim 11, wherein the throttle control signal adjusts a switching frequency of the inverter circuit of at least one of the first power module and the second power module.

15. The method of claim 11, further comprising generating a second throttle control signal and transmitting the second throttle control signal to the second power module.

16. The method of claim 11, wherein the master controller is the local controller of one of the plurality of power modules.

17. The method of claim 11, wherein the threshold power level is less than 100% of a maximum output power of the first power module.

18. The method of claim 11, wherein the DC bus voltage of each of the plurality of power modules is below 50 volts.

19. The method of claim 11, wherein the throttle control signal is a DC voltage signal between 0 volts and a maximum control voltage level.

20. The method of claim 11, further comprising, in response to detecting that the output power of the first of the plurality of power modules exceeds the threshold power level, transmitting a control signal to the first power module to reduce the output power of the first power module.

* * * * *